US008421864B2

(12) United States Patent
Tano

(10) Patent No.: US 8,421,864 B2
(45) Date of Patent: Apr. 16, 2013

(54) OPERATION MANAGEMENT DEVICE TO BE MOUNTED TO A MOVING OBJECT, PORTABLE INFORMATION TERMINAL, OPERATION MANAGEMENT SERVER, AND COMPUTER PROGRAM

(75) Inventor: Michiyasu Tano, Tokyo (JP)

(73) Assignee: Data Tec Co., Ltd., Tokyo (JP)

( * ) Notice: Subject to any disclaimer, the term of this patent is extended or adjusted under 35 U.S.C. 154(b) by 0 days.

(21) Appl. No.: 13/289,339

(22) Filed: Nov. 4, 2011

(65) Prior Publication Data

US 2012/0224827 A1 Sep. 6, 2012

(30) Foreign Application Priority Data

Mar. 3, 2011 (JP) ................................ 2011-046357

(51) Int. Cl.
*H04N 7/18* (2006.01)

(52) U.S. Cl.
USPC ........................................................ 348/148

(58) Field of Classification Search ........................ None
See application file for complete search history.

(56) References Cited

U.S. PATENT DOCUMENTS

| | | | | |
|---|---|---|---|---|
| 6,950,020 | B2 * | 9/2005 | Shimamoto et al. | 340/539.16 |
| 7,005,982 | B1 * | 2/2006 | Frank | 340/539.26 |
| 7,079,927 | B1 * | 7/2006 | Tano et al. | 701/29.6 |
| 7,298,289 | B1 * | 11/2007 | Hoffberg | 340/903 |
| 2008/0072284 | A1 * | 3/2008 | Horvitz et al. | 726/2 |
| 2009/0318121 | A1 | 12/2009 | Marumoto | |

FOREIGN PATENT DOCUMENTS

| | | | |
|---|---|---|---|
| EP | 1 615 718 | | 1/2006 |
| JP | 2003219061 | A | 7/2003 |
| JP | 2006245836 | A | 9/2006 |
| JP | 2007300150 | A | 11/2007 |
| JP | 2008236385 | A | 10/2008 |
| JP | 2010114588 | A | 5/2010 |
| JP | 2010238214 | A | 10/2010 |
| WO | 2006075419 | A1 | 7/2006 |

OTHER PUBLICATIONS

International Search Report for European Patent Application No. 11007288.1-1229 dated Dec. 16, 2011.

* cited by examiner

*Primary Examiner* — Nhon Diep
(74) *Attorney, Agent, or Firm* — Bachman & LaPointe, P.C.

(57) ABSTRACT

Provided is an operation management device that works in conjunction with a portable information terminal having an operation management function. A cradle (10) includes a holder (10*a*) formed with a concave shape for mounting a portable information terminal (20) having the operation management function, a receiving casing (10*c*) for receiving electronic equipment parts, and an arm (10*b*) for coupling the holder (10*a*) and the receiving casing (10*c*), and uses a display of the portable information terminal (20). The receiving casing (10*c*) includes a sensor section including a measuring instrument that is not included in the portable information terminal (20) or a measuring instrument having a higher accuracy than the portable information terminal (20) and a communication unit such as a data communication interface for transmitting a detection result from the sensor section as information for supplementation used for operation management to the portable information terminal (20) by short-range radio communications.

10 Claims, 14 Drawing Sheets

FIG. 3

| DATE/TIME | t 0 | t 1 | t 2 | ・・・ | t n |
|---|---|---|---|---|---|
| FORE-AND-AFT ACCELERATION [m/s2] | af (t 0) | af (t 1) | af (t 2) | ・・・ | af (t n) |
| LATERAL ACCELERATION [m/s2] | as (t 0) | as (t 1) | as (t 2) | ・・・ | as (t n) |
| VERTICAL ACCELERATION [m/s2] | au (t 0) | au (t 1) | au (t 2) | ・・・ | au (t n) |
| ROLL ANGULAR VELOCITY [°/s] | ωr (t 0) | ωr (t 1) | ωr (t 2) | ・・・ | ωr (t n) |
| PITCH ANGULAR VELOCITY [°/s] | ωp (t 0) | ωp (t 1) | ωp (t 2) | ・・・ | ωp (t n) |
| AZIMUTH ANGULAR VELOCITY [°/s] | ωy (t 0) | ωy (t 1) | ωy (t 2) | ・・・ | ωy (t n) |
| POSITIONAL INFORMATION (LATITUDE) | Pn (t 0) | Pn (t 1) | Pn (t 2) | ・・・ | Pn (t n) |
| POSITIONAL INFORMATION (LONGITUDE) | Pe (t 0) | Pe (t 1) | Pe (t 2) | ・・・ | Pe (t n) |

FIG. 6

| | | | | |
|---|---|---|---|---|
| DATE/TIME | t | ・・・ | tm | ・・・ |
| POSITIONAL INFORMATION | P(t) | ・・・ | P(tm) | ・・・ |
| EVENT TYPE | i | ・・・ | i | ・・・ |
| ANGULAR VELOCITY [°/s] | ω(t) | ・・・ | ω(tm) | ・・・ |
| ACCELERATION [°/s2] | a(t) | ・・・ | a(tm) | ・・・ |
| SPEED [m/s] | S(t) | ・・・ | S(tm) | ・・・ |
| RECORDING SIZE | B | ・・・ | B | ・・・ |
| TRAVEL DISTANCE [m] | D(t) | ・・・ | D(tm) | ・・・ |
| VIDEO FILE | $V_A$(t) | ・・・ | $V_A$(tm) | ・・・ |
| AUDIO FILE | $V_0$(t) | ・・・ | $V_0$(tm) | ・・・ |

OPERATION MANAGEMENT DEVICE TO BE MOUNTED TO A MOVING OBJECT, PORTABLE INFORMATION TERMINAL, OPERATION MANAGEMENT SERVER, AND COMPUTER PROGRAM

BACKGROUND OF THE INVENTION

1. Field of the Invention

The present invention relates to an operation management device for performing operation management for a moving object by, for example, detecting a behavior (movement) of the moving object, a portable information terminal that works in conjunction with the operation management device, and a computer program for causing a computer device to have an operation management function. Here, the "moving object" represents a vehicle, a two-wheeler, a vessel, an aircraft, or the like, and the "operation management" is to detect a behavior caused by the moving object in operation, analyze operation information, perform various settings for obtaining the operation information, and process contents of other information regarding the operation.

2. Description of the Related Art

There is known a drive recorder for collecting operation information generated by a vehicle being driven and analyzing contents of the collected operation information. The operation information collected by the drive recorder includes, for example, angular velocity data on roll, pitch, and yaw, two-dimensional or three-dimensional acceleration data, global positioning system (GPS) data indicating the latitude, longitude, speed, and azimuth, and vehicle speed data obtained by receiving an input of a vehicle speed pulse from a vehicle measuring instrument.

By analyzing such operation information, it is possible to identify an accident cause of a traffic accident that has occurred and to grasp a manipulation tendency exhibited by a driver in manipulation of the vehicle, for example, a repeated habit specific to the driver such as performing abrupt acceleration often, being slow to start braking, or being likely to cause a wobble, and it is also possible to prompt the driver for safe driving.

However, a measuring instrument for measuring the operation information with a high accuracy is necessary in order to enhance reliability in identifying the accident cause and grasping the manipulation tendency for the vehicle, and hence a dedicated drive recorder becomes expensive. Further, an analysis of the operation information collected by the drive recorder is performed by using a personal computer, which is therefore inconvenient for a general user.

Against this backdrop, recent years have seen the advent of a portable information terminal including an information processor in which a sensor such as an accelerometer is mounted and the same function as the drive recorder is realized by software.

For example, a portable information terminal disclosed in Japanese Patent Application Laid-open No. 2007-300150, which has a video recording function, is mounted to a dedicated cradle and kept in a recording state at all times, and when an impact of a traffic accident that occurs suddenly is sensed by a sensor, records a video image for a predetermined time before and after the occurrence of the impact. This contributes to clarification of the accident cause and decision in insurance negotiation.

Further, a drive recorder disclosed in Japanese Patent Application Laid-open No. 2010-238214 includes: a data collecting section for continually collecting driving condition data on a vehicle; a storage section for storing the driving condition data in a nonvolatile manner; a communication section for performing mutual communications with a portable information terminal with or without cable; and a control section for comprehensively controlling those functional sections, and the control section transmits/receives the driving condition data and operation setting data to/from the portable information terminal. With this configuration, various settings to be performed on the drive recorder are facilitated, and the driving condition data is viewed on a display of the portable information terminal or transmitted to a predetermined server as it is by using a communication function, thereby realizing a highly-convenient drive recorder.

Japanese Patent Application Laid-open No. 2007-300150 includes no description about a sensor, but a portable information terminal of this kind is normally used by being manipulated by a human. Therefore, even if the sensor is to be provided, a simple sensor with low sensitivity such as an accelerometer is used in general. This leaves a problem that even if the portable information terminal is secured to a vehicle via the dedicated cradle, operation information having sufficient accuracy cannot be collected, which is not enough to identify the accident cause or grasp a manipulation tendency exhibited by a driver in manipulation of the vehicle.

Further, the drive recorder disclosed in Japanese Patent Application Laid-open No. 2010-238214 collects operation conditions of the vehicle and uses only the communication function and the display provided to the portable information terminal, which leave a problem of not contributing to cost reduction of the drive recorder itself.

SUMMARY OF THE INVENTION

A primary object of the present invention is to provide a technology which realizes functions of, for example, a drive recorder described above at low cost and which can also supplement an operation management function of the portable information terminal.

In order to solve the above-mentioned problems, the present invention provides a portable information terminal, an operation management device to be mounted to a moving object, an operation management server, and a computer program.

A portable information terminal according to the present invention includes: a first sensor section for detecting a behavior of a moving object and operation information on the moving object including a timestamp, a position, and a video image that are obtained at an occurrence of the behavior; short-range radio communication means for performing short-range radio communications with an operation management device including a second sensor section for detecting the behavior of the moving object with a higher accuracy than the first sensor section; information acquiring means for acquiring a detection result from the second sensor section from the operation management device through the short-range radio communication means; and operation management means for supplementing a detection result from the first sensor section with the acquired detection result from the second sensor section, determining whether or not the supplemented operation information matches a predetermined condition, and if the predetermined condition is matched, recording the supplemented operation information in a predetermined recording area as event information.

The portable information terminal configured as described above uses the detection result of the behavior not from the first sensor section but from the second sensor section having a higher accuracy, which enables the determination as to whether or not the condition is matched to be performed more accurately.

In one aspect of the present invention, the portable information terminal further includes: public communication means for performing public communications; and communication control means for transmitting the event information recorded in the predetermined recording area to a specified communication counterpart through the public communication means. This facilitates the transmission of the event information to an external portion.

In another aspect of the present invention, the portable information terminal further includes a display, in which the operation management means acquires environmental information that affects an operation of the portable information terminal from the operation management device through the short-range radio communication means, determines whether or not the acquired environmental information is within an allowable range set in advance, generates alert information if the acquired environmental information is out of the allowable range, and outputs the alert information to the display. Accordingly, it is possible to use the portable information terminal (display) as display means and prompt the driver (manipulator) to take a quick action.

An operation management device to be mounted to a moving object according to the present invention includes: a holder for securing a portable information terminal for performing operation management of the moving object to a predetermined site of the moving object, the portable information terminal including a first sensor section for detecting a behavior of the moving object and operation information on the moving object including a timestamp, a position, and a video image that are obtained at an occurrence of the behavior; short-range radio communication means that allows short-range radio communications to be performed with the portable information terminal; a second sensor section for detecting the behavior of the moving object with a higher accuracy than the first sensor section; information transmission means for transmitting a detection result from the second sensor section to the portable information terminal through the short-range radio communication means to thereby allow the portable information terminal to supplement the operation management; information recording means for recording the detection result from the second sensor section onto a memory medium classified according to one of the moving object and a driver who drives the moving object; and a medium receiving mechanism for receiving the memory medium.

The operation management device configured as described above can enhance the accuracy of the detection result from the first sensor section of the portable information terminal, in particular, the detection result of the behavior of the moving object. Further, the detection result from the second sensor section is recorded onto the memory medium, which allows an operation analysis to be performed after the end of the operation.

In another aspect of the present invention, the information recording means converts the detection result from the second sensor section into a data structure that cannot be decrypted by one of an owner and the driver of the moving object according to an encryption logic identified by encryption information, and records the converted information onto the memory medium.

Accordingly, it is possible to suppress the tampering or the like of the information recorded on the memory medium attempted by the one of the owner and the driver of the moving object. In addition, the encryption logic to be used can be switched over flexibly and quickly even in, for example, a case where the specified encryption logic differs depending on the automobile liability insurance company with which the vehicle is contracted, a case where different drivers drive the vehicle, or a case where the vehicle driven by one driver changes many times a day.

Further, in another aspect of the present invention, the second sensor section includes an environment detection sensor for measuring an environment in which the portable information terminal secured to the holder is placed; and the information transmission means transmits a measured value obtained by the environment detection sensor to the portable information terminal through the short-range radio communication means as environmental information that influences the operation of the portable information terminal.

Accordingly, it is possible to determine whether or not the portable information terminal is placed in an environment in which the portable information terminal can operate normally.

An operation management server according to the present invention includes: a common access area that can be viewed through public communications by the portable information terminal of the present invention (including a display) that performs short-range radio communications with the operation management device of the present invention; information acquiring means for acquiring operation information from each portable information terminal; evaluation means for classifying the acquired operation information according to an operation environment, and performing a ranking evaluation of the classified operation information; and management means for posting result information on the ranking evaluation in the common access area.

A computer program provided by the present invention can be read by a portable information terminal, the portable information terminal including: a first sensor section for detecting a behavior of a moving object and operation information on the moving object including a timestamp, a position, and a video image that are obtained at an occurrence of the behavior; a communication function for performing short-range radio communications with a communication counterpart; and a computer. The computer program causes the computer to function as: information acquiring means for acquiring, from an operation management device including a second sensor section, a detection result from the second sensor section through the short-range radio communications, the second sensor section detecting the behavior of the moving object with a higher accuracy than the first sensor section; and operation management means for supplementing a detection result from the first sensor section with the acquired detection result from the second sensor section, determining whether or not the supplemented operation information matches a predetermined condition, and if the predetermined condition is matched, recording the supplemented operation information in a predetermined recording area as event information.

According to the portable information terminal of the present invention, even if the detection accuracy of the first sensor section, in particular, the detection accuracy for the behavior of the moving object is not high, the low detection accuracy can be compensated with the detection result having a high accuracy which is acquired by the second sensor section of the operation management device, thereby enabling the determination as to whether or not the condition is matched to be performed more accurately. Further, the portable information terminal and the operation management device exchange the information through the short-range radio communications, and therefore do not need to be connected to each other by cables, which is extremely easy to handle. In addition, a narrow coverage reduces the risk of, for example, skimming attempted from outside of the vehicle.

The operation management device according to the present invention can realize the operation management function in conjunction with the portable information terminal as described above. Therefore, for example, among functions and constituent parts that are necessary to realize the drive recorder function, ones included in the portable information terminal can be omitted, and hence it is possible to suppress an increase in cost.

BRIEF DESCRIPTION OF THE DRAWINGS

In the accompanying drawings:

FIG. 3 is an explanatory diagram of contents of operation information recorded in a memory medium;

FIG. 6 is an explanatory diagram of contents of event information recorded in a recording area of the portable information terminal;

DETAILED DESCRIPTION OF THE PREFERRED EMBODIMENT

Described hereinafter is an embodiment in which an operation management device of the present invention is applied to a cradle to be mounted to a vehicle and a portable information terminal of the present invention is realized by a multifunction cellular phone that has become widespread in recent years. The "cradle" is a holder for holding the portable information terminal in a predetermined site of the vehicle. The multifunction cellular phone is an information terminal that not only has a public communication (telephone) function but also includes a display, a computer, a memory, and instruments such as an accelerometer, a GPS receiver, a sound collecting microphone, and a camera. Characteristic functions of the present invention are realized by installing a computer program of the present invention on such a multifunction cellular phone.

Figure 1:
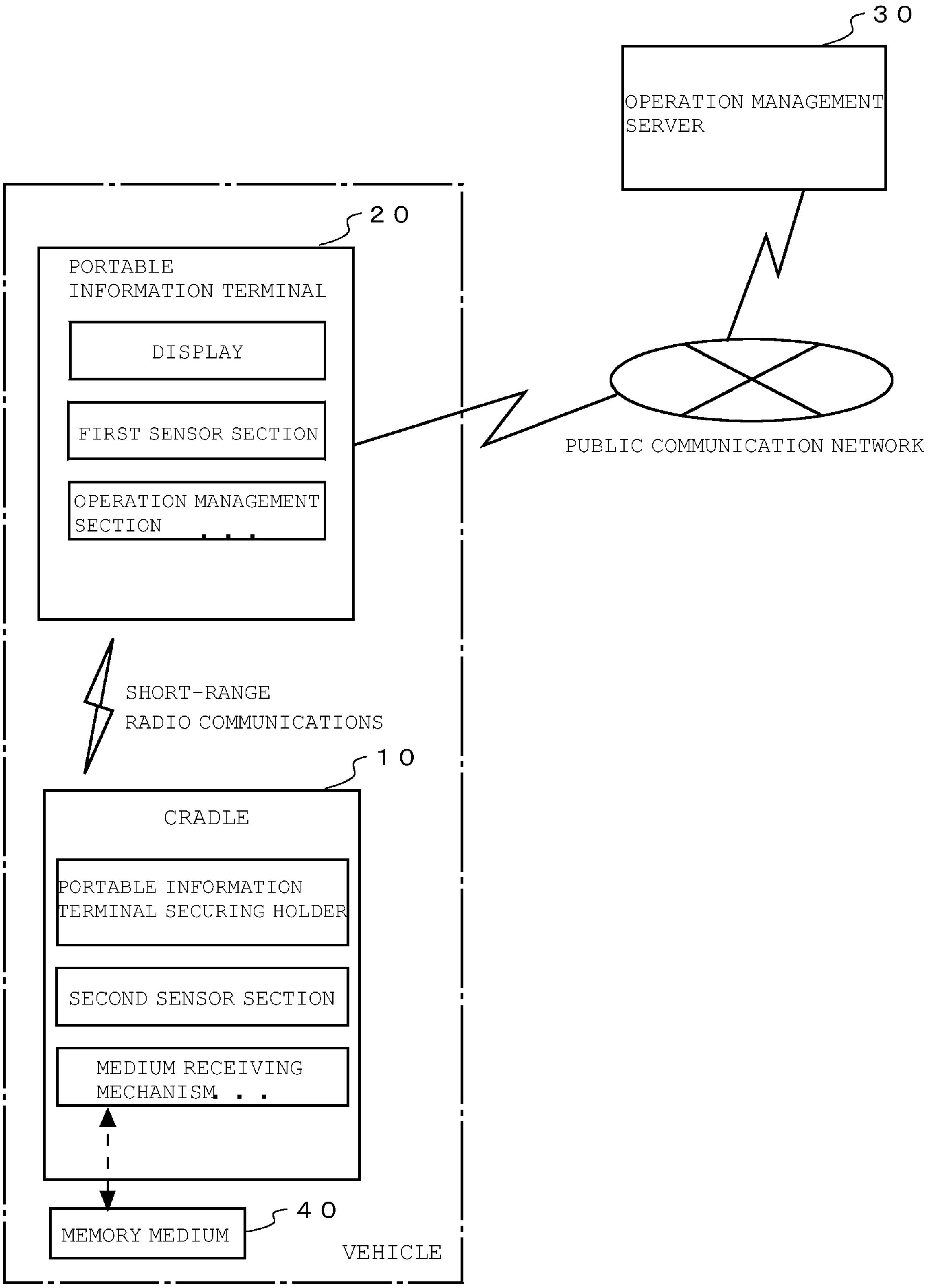
FIG. 1 is a schematic diagram illustrating an entire configuration of an embodiment of the present invention.

FIG. 1 illustrates an entire schematic configuration of this embodiment. In the vehicle illustrated in FIG. 1, the cradle 10 including a portable information terminal securing holder, a second sensor section, and a medium receiving mechanism is mounted, and a portable information terminal 20 including a display, a first sensor section, and an operation management section is placed in the portable information terminal securing holder, thereby realizing operation management of the vehicle. Further, different kinds of information for performing an operation analysis after the end of the operation, which include a detection result from the second sensor section, are recorded in a memory medium 40 inserted into the medium receiving mechanism. The cradle 10 and the portable information terminal 20 are configured to be able to perform bidirectional transmission of information by short-range radio communications, and the portable information terminal 20 is further configured to be able to perform bidirectional transmission of information via a public communication network with an operation management server 30 that is run by, for example, a company to which a driver driving the vehicle belongs or an automobile liability insurance company. The respective functional components are described in detail hereinbelow.

Functional Components and the Like of the Cradle

Figure 2:
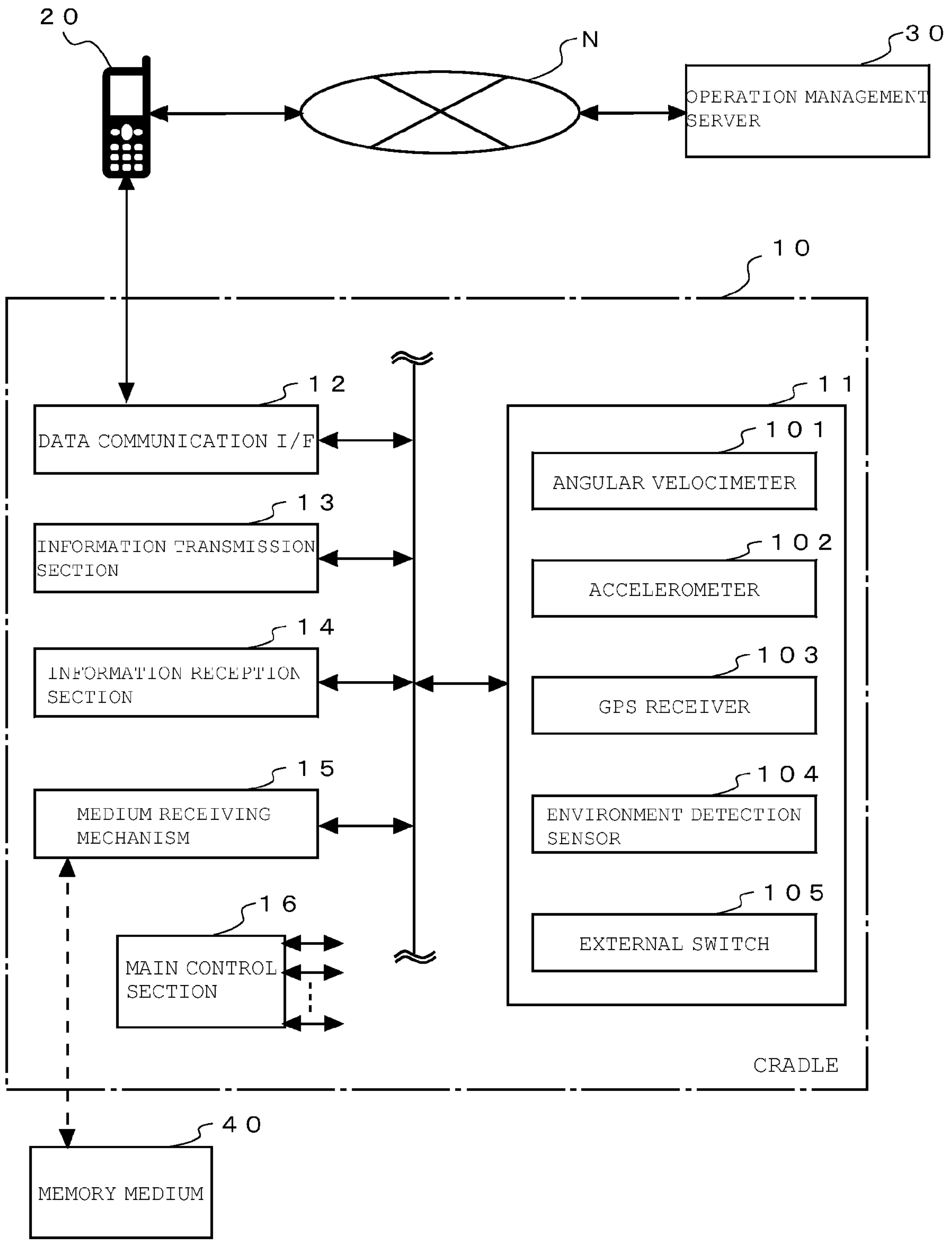
FIG. 2 is a functional configuration diagram of a cradle to which the present invention is applied.

FIG. 2 is a functional configuration diagram of a cradle according to this embodiment.

The cradle 10 mainly includes a sensor section 11 (second sensor section in FIG. 1), a data communication interface (I/F) 12, an information transmission section 13, an information reception section 14, a medium receiving mechanism 15, and a main control section 16, and operates as a component of a drive recorder that works in conjunction with the portable information terminal 20.

The information transmission section 13, the information reception section 14, and the main control section 16 are realized by cooperation between hardware resources of a computer device including a processor and an internal memory, which is incorporated into the cradle 10, and a predetermined computer program. The computer device includes a real time clock (RTC) module for outputting timestamp data indicating year/month/day and a synchronous clock for control operation.

The data communication I/F 12 is an interface that enables the short-range radio communications with the portable information terminal 20, and functions as communication control means in cooperation with the main control section 16. The short-range radio communications represent a well-known communication mode that allows information transmission to be performed with the portable information terminal 20 within a narrow coverage from tens of centimeters to several meters without routing wire cables or bringing electric contact points into contact with each other. The above-mentioned short-range radio communications can be realized by using, for example, known Bluetooth (registered trademark) or Wi-Fi (registered trademark).

The information transmission section 13 allows information to be transmitted to the portable information terminal 20 in cooperation with the data communication I/F 12. The information reception section 14 allows reception of information transmitted from the portable information terminal 20 in cooperation with the data communication I/F 12. The main control section 16 comprehensively controls overall processing operations of the cradle 10, and also functions as information transmission means in cooperation with the information transmission section 13 and the data communication I/F 12.

Further, the main control section 16 organizes a communication environment by setting communication setting information for the portable information terminal 20 with which the short-range radio communications are performed and personal information in the memory medium 40, and controls a timing and the like for the short-range radio communications performed with the portable information terminal 20. The settings and changes thereof can be performed through the short-range radio communications from the portable information terminal 20 described later. In addition, the main control section 16 controls recording of different kinds of information to the memory medium 40 as information recording means.

The sensor section 11 has a higher accuracy than a sensor section 21 of the portable information terminal 20 described later, and includes an angular velocimeter 101, an accelerometer 102, a global positioning system (GPS) receiver 103, an environment detection sensor 104, an external switch 105, a known data conversion section (not shown) for converting analog data into digital data, and a data correction section (not shown) for performing a processing for removing an offset component and a drift component from an output from the angular velocimeter 101 or other such processings. The data correction section (not shown) may be provided with reference to, for example, the disclosure of Japanese Patent Application Laid-open No. 10-132849.

The angular velocimeter 101 detects angular velocities (roll, pitch, and yaw) about three-dimensional axes from the vehicle, and based on angular velocity data obtained by integrating the detection results, can detect behaviors such as cornering and wobbling of the vehicle.

The accelerometer 102 detects accelerations of the vehicle in fore-and-aft/lateral/vertical directions (such as accelerator acceleration, braking acceleration, and lateral acceleration during the cornering). The behaviors of the vehicle at an impact or at a time of application of the brakes/accelerator can be detected based on the thus-obtained acceleration data.

The GPS receiver 103 receives GPS data indicating the current latitude, longitude, speed, azimuth, time, and the like of the vehicle.

The environment detection sensor 104 detects a state of an environment in which the cradle 10 is placed, that is, an environment in which the portable information terminal 20 is placed, for example, an ambient temperature in the vicinity of the place where the portable information terminal 20 is placed. For a simpler structure, an existing thermometer for detecting the above-mentioned ambient temperature can be used. The detection results are transmitted to the portable information terminal 20 as environmental information.

The external switch 105 outputs, for example, data that issues an instruction to forcedly record operation information when turned on by the driver.

Note that, the sensor section 11 does not necessarily include all of the angular velocimeter 101, the accelerometer 102, the GPS receiver 103, the environment detection sensor 104, and the external switch 105, and may include only part thereof. Further, data to be measured by the angular velocimeter 101 may be substituted by data to be measured by at least one accelerometer. In addition, from the viewpoint of further enhancing the functions, there may be provided a receiver for receiving an image pickup signal from an on-board camera (not shown) placed in a predetermined site of the vehicle, a receiver for receiving an audio signal from a sound collecting mechanism, a receiver connected to a controller area network (CAN) communication network mounted to the vehicle for receiving data such as a moving speed and a fuel consumption amount of the vehicle from an external portion, and other such components so as to use information detected by those components as part of the operation information.

The medium receiving mechanism 15 detachably receives the memory medium 40, and enables data to be read from and written to the respective components of the cradle 10 when receiving the memory medium 40. The memory medium 40 is obtained by mounting a nonvolatile semiconductor memory to a card medium or a stick medium. A management data recording area and a detection data recording area are formed in the semiconductor memory.

Recorded in the management data recording area are identification information on the portable information terminal 20, a transmission address of the operation management server 30, a behavior condition (described later in detail), and other such management data. In the detection data recording area, all the information including the behaviors detected by the sensor section 11 is recorded at all times in order to allow the operation analysis to be performed after the end of the operation. When an instruction to back up event information described later is received from the portable information terminal 20, the event information is also recorded to the detection data recording area.

Note that, at the time of the recording in the memory medium 40, a security level can also be set for a person permitted to read the recorded information.

The security level is a zero level at default, that is, a level that allows anyone to read the recorded information. At a given security level, the recorded information is converted into a data structure that cannot be decrypted by an owner of the vehicle or the driver according to an encryption logic or the like whose key is possessed by a person who issues the memory medium 40. Hereinafter, the conversion into the above-mentioned data structure is also referred to as "encryption". This can prevent the information from being tampered by the driver driving the vehicle, the owner of the vehicle (for example, a manager of the driver), or the like.

Further, it is also possible to apply a different encryption logic or the like to each vehicle or each driver. In this case, for example, a person who issues the memory medium 40 previously records a specific encryption logic or the like to be used onto the memory medium 40 in the management data recording area, or identifies the different encryption logics to be used for encryption information for the respective vehicles and respective drivers by previously recording a plurality of encryption logics or the like onto the memory medium 40 in the management data recording area.

FIG. 3 is a diagram illustrating an example of information recorded onto the memory medium 40 in the detection data recording area at all times. In FIG. 3, a "fore-and-aft acceleration", a "lateral acceleration", and a "vertical acceleration" are detection results from the accelerometer 102 of the second sensor section 11. A "roll angular velocity", a "pitch angular velocity", and an "azimuth angular velocity" are detection results from the angular velocimeter 101 of the second sensor section 11. A "position (latitude)" and a "position (longitude)" are derived based on the GPS data received by the GPS receiver 103 of the second sensor section 11. A "date/time" is a current timestamp data obtained from the above-mentioned RTC module.

Shape and the Like of the Cradle

Next, an example of an external appearance and a shape of the cradle 10 is described with reference to FIGS. 4A and 4B.

Figure 4A:
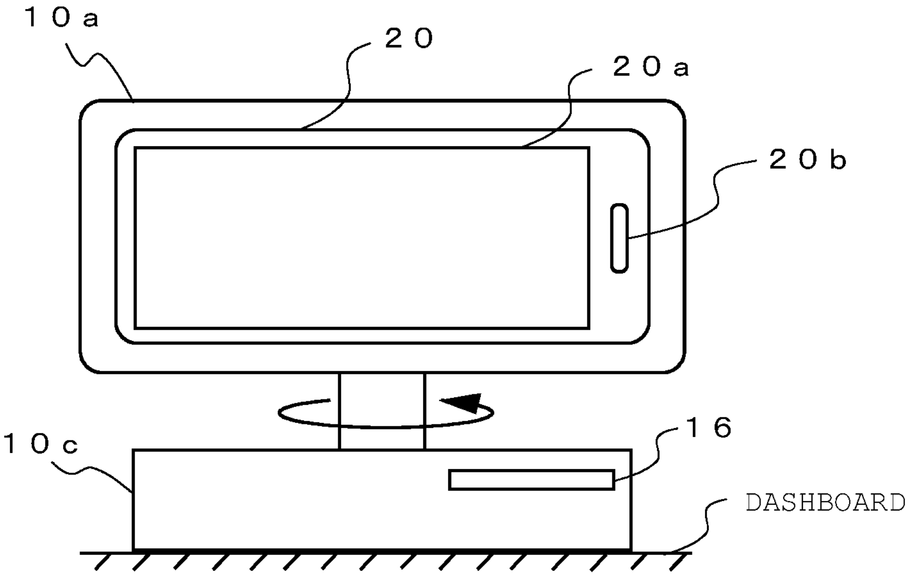
FIGS. 4A and 4B are diagrams illustrating an external appearance of the cradle.
Figure 4B:
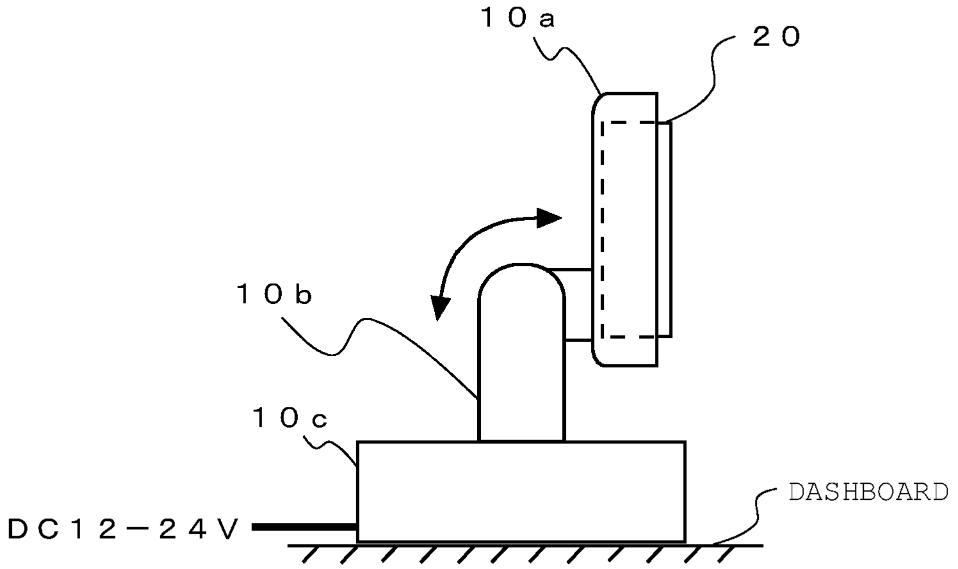

FIG. 4A is a front view of the cradle 10, and FIG. 4B is a side view thereof, each of which illustrates a held state of the portable information terminal 20. The cradle 10 has a structure including a holder 10*a* formed to have a concave shape for mounting the portable information terminal 20, a receiving casing 10*c* for receiving electronic equipment parts of the above-mentioned computer device or the like, and an arm 10*b* for coupling the holder 10*a* and the receiving casing 10*c*.

The driver does not need to manipulate the cradle 10 except for inserting or detaching the memory medium 40 into/from the medium receiving mechanism 15. All necessary manipulation is performed through touch buttons displayed on a display area 20*a* of the portable information terminal 20 and a button operation portion 20*b*, and results thereof are transmitted to the cradle 10 by the short-range radio communications. Therefore, the arm 10*b* has a structure such as, for example, a universal pan head in order to not only allow an orientation of the display area 20*a* to be adjusted but also allow the portable information terminal 20 to be firmly secured.

The cradle 10 is supplied with power by being electrically connected to a power system of the vehicle, but can manage the power supply even when the power system of the vehicle is under abnormal conditions by being provided with a secondary battery (not shown) and a charging mechanism (not shown) inside the receiving casing 10*c*.

Functional Components and the Like of the Portable Information Terminal

Next, the portable information terminal 20 is described in detail. The above-mentioned multifunction cellular phone can be used as the portable information terminal 20. Described here as an example is a case where a computer program of the present invention is installed into the multifunction cellular phone, and where functions of the drive recorder are realized in conjunction with the cradle 10 by using the measuring instruments, the computer device and memory, the communication mechanism, and the display that are normally provided to the multifunction cellular phone.

Figure 5:
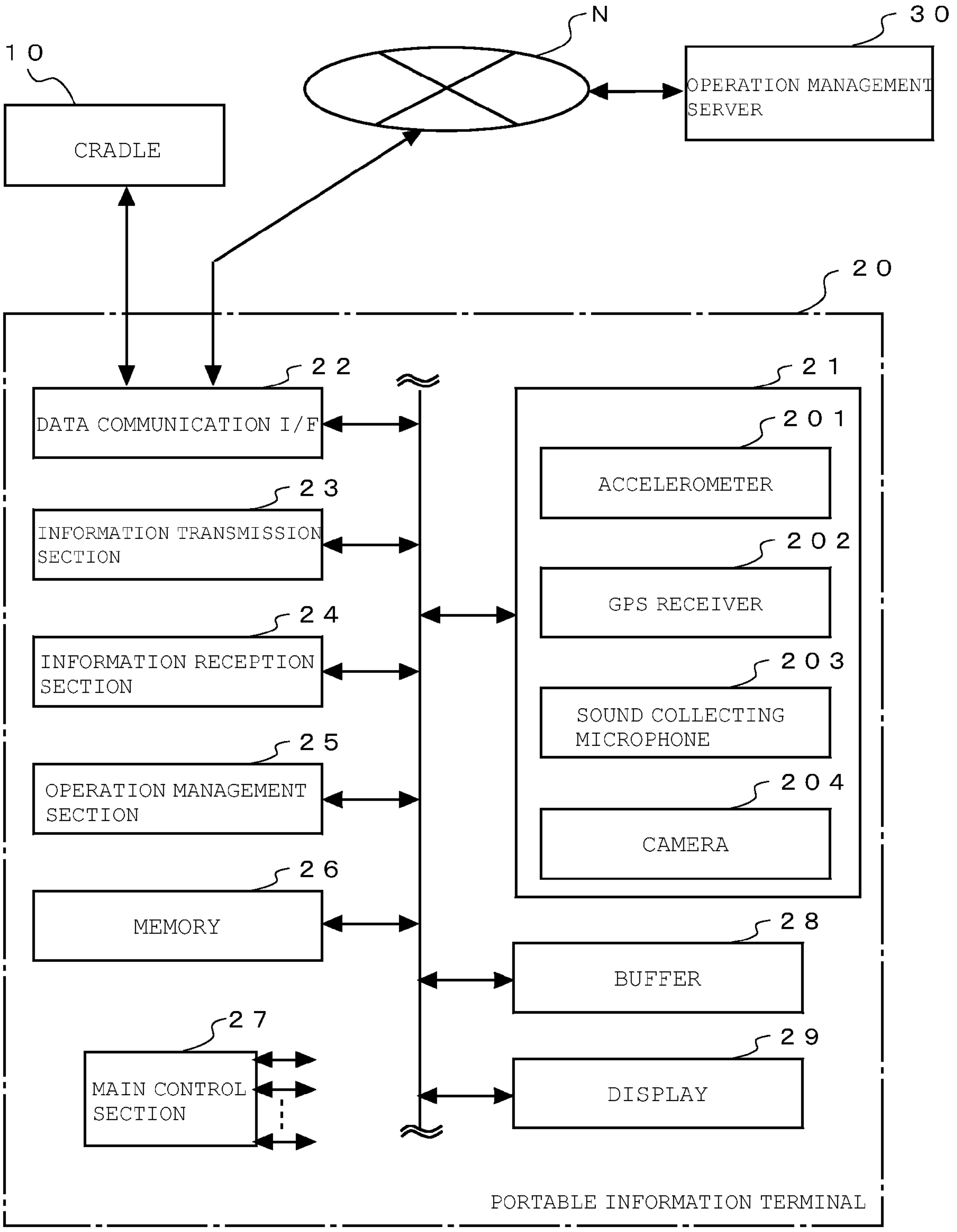
FIG. 5 is a functional configuration diagram of a portable information terminal.

FIG. 5 is a functional configuration diagram of the portable information terminal 20. With reference to FIG. 5, the portable information terminal 20 includes the sensor section 21 (first sensor section in FIG. 1), a data communication interface (I/F) 22, an information transmission section 23, an information reception section 24, an operation management section 25, a nonvolatile memory 26, a main control section 27, a nonvolatile buffer 28, and a display 29. The buffer 28 is desirably a ring buffer of such a closed-loop system that a pointer indicating a data writing point returns to the initial position after the last position, but the present invention is not limited thereto. The display 29 allows touch input such as the touch buttons as described above. Note that, a numeric keypad or the like are omitted here.

The sensor section 21 is configured by including an accelerometer 201, a GPS receiver 202, a sound collecting microphone 203, a camera 204, and interfaces to those components, which are included in the multifunction cellular phone. In a case where the sensor section 11 of the cradle 10 can substitute the above-mentioned components, all the components do not necessarily exist in the multifunction cellular phone. In contrast, in a case where the components can be externally provided, necessary measuring instruments are added for use.

The accelerometer 201 detects characteristics (tendency) including an accident-related behavior and roughness of driving, such as the accelerations of the vehicle in the fore-and-aft/lateral directions (such as the accelerator acceleration, braking acceleration, and cornering acceleration).

The GPS receiver 202 detects the current latitude, longitude, speed, azimuth, and the like of the vehicle.

The sound collecting microphone 203 collects sound around the portable information terminal 20.

The camera 204 takes images of situations in front of the vehicle. The operation information on the behavior of the vehicle or the like generated by the operation can be detected by the measuring instruments described above.

However, the data detected by the accelerometer 201 and the GPS receiver 202 is used in a case where the portable information terminal 20 is caused to independently function as the drive recorder, and in a case where the cradle 10 is equipped as in this embodiment, is supplemented by the information detected by the sensor section 11 of the cradle 10 with a higher accuracy. Supplementation of information is described later in detail.

In the same manner as the sensor section 11 of the cradle 10, the sensor section 21 also includes a data conversion section (not shown) for converting analog data into digital data as necessary. The information output from the sensor section 21 is recorded in the buffer 28 in association with the current timestamp data.

The data communication interface (I/F) 22 is an interface that enables the short-range radio communications with a public communication network N (such as the operation management server 30) and the cradle 10, and functions as communication control means in cooperation with the main control section 27. The communications with the cradle 10 are performed by using one incorporated into the cradle 10 from among, for example, Bluetooth (registered trademark) and Wi-Fi (registered trademark).

The information transmission section 23 can transmit information to the cradle 10 or the public communication network N (such as the operation management server 30) in cooperation with the data communication I/F 22, and the information reception section 24 can receive information from the cradle 10 or the public communication network N (such as the operation management server 30) in cooperation with the data communication I/F 22.

The operation management section 25 manages the operation information on the vehicle. Specifically, the operation management section 25 performs the following processings:

(1) Setting of the communication environment and the different kinds of information for the own terminal.

Different kinds of conditions including the behavior condition for determining the behavior of the vehicle as a specific behavior are set in addition to settings of communication information on the cradle 10 with which the short-range radio communications are performed and the personal information. The settings are performed through the display 29 (touch panel). The set information is recorded in the memory 26.

(2) Different kinds of settings for the cradle 10 to be a communication counterpart.

After a communication channel for the short-range radio communications with the cradle 10 is established, the display 29 (touch panel) is used to set the different kinds of information to be set for the cradle 10 by specifying a saving destination thereof (in the management data recording area of the memory medium 40 inserted into the cradle 10). The same applies to the confirmation or changing of the set contents.

(3) Supplementation of information.

The wording "supplementation of information" represents making information more complete by making up for insufficient part. For example, by using the detection results from the angular velocimeter 101 and the environment detection sensor 104 of the cradle 10, it is possible to handle even the sensor section 21 that is not provided with an angular velocimeter or the like as if the sensor section 21 were provided therewith. Further, in place of the accelerometer 201 of the sensor section 21, by using the detection result from the accelerometer 102 of the sensor section 11 having a higher accuracy along with the detection result from the angular velocimeter, it is possible to enhance the detection accuracy more remarkably than in a case where the sensor section 21 is solely used. As described above, the operation management can be performed more finely and accurately on the portable information terminal 20 based on the supplemented operation information.

Further, when there is a discrepancy between the detection results from the GPS receivers 103 and 202 used together, a processing for outputting alert information that prompts for confirmation can also be performed by the supplementation of the information.

(4) Event detection.

The operation management section 25 determines whether or not the supplemented operation information matches a predetermined condition at all times. The term "event" is used herein, for example, in the sense of an event defined as the specific behavior to be detected. The "condition" represents the behavior condition for determining whether or not such an event has occurred. In this embodiment, the specific behavior is classified into the following three kinds of a "general behavior", a "dangerous behavior", and an "accident-related behavior" according to the purpose, but the specific behavior is not necessarily limited to this classification.

Among the behaviors of the vehicle, the "general behavior" represents a behavior, speed, and the like exhibited in, for example, daily-performed driving, that is, driving with a relatively smaller degree of danger, at a time of cornering at an intersection, at a time of stopping at an intersection, at a time of manipulating the brakes, or at a time of manipulating the reverse gear. The behavior condition for determining that the supplemented operation information matches the characteristics of such a general behavior is, for example, at least one of or a predetermined combination of the acceleration data, the angular velocity data, and data representing speed each being equal to or larger than a first threshold value (equal to or larger than 0) and equal to or smaller than a second threshold value (threshold value exceeding the first threshold value), which are generated at the time of starting, stopping, cornering, accelerating, or decelerating of the vehicle.

The "dangerous behavior" represents a behavior that has exceeded a level of the daily-performed driving to reach a critical region that is likely to cause an accident. The behavior condition for determining that the supplemented operation information matches the characteristics of such a dangerous behavior is, for example, at least one of or a predetermined combination of the acceleration data, the angular velocity data, and the data representing speed each exceeding the second threshold value within a predetermined time.

The "accident-related behavior" represents a behavior detected when the vehicle actually causes an accident or is involved in an accident. The behavior condition for determining that the supplemented operation information matches the characteristics of such an accident-related behavior is at least one of or a predetermined combination of the acceleration data, the angular velocity data, and the data representing speed each exceeding a third threshold value (threshold value exceeding the second threshold value).

(5) Generation of the event information.

If the operation management section 25 determines that the supplemented operation information matches the above-mentioned behavior condition, the operation management section 25 generates the supplemented operation information at the occurrence of the event as the event information. The event information represents information related to the type of event and the occurrence of the event. The type of event is, for example, identification information for identifying what kind of behavior the event corresponds to, and is distinguished by characters, symbols, or the like affixed to the file name. The information related to the occurrence of the event includes, for example, the occurrence date/time, the occurrence place (positional information), and the operation information (including video/audio data) obtained at the time of the occurrence.

(6) Recording and transmission of the event information.

The event information is recorded to the memory 26, and at the same time, the event information recorded in the memory 26 is transmitted to the cradle 10 for backup along with an instruction to record the event information and is recorded onto the memory medium 40 in the detection data recording area. Further, the event information is also transmitted to the operation management server 30 as necessary. The transmission address for transmitting the event information to the operation management server 30 is, for example, previously recorded on the memory medium 40 in the management data recording area. By automatic transmission using the transmission address, it is possible to notify an administrator of the operation management server 30 or the like that the event has occurred as early as possible.

In that case, from the viewpoint of preventing the event information from being tampered by the driver (manipulator of the portable information terminal 20), the event information may be transmitted after being encrypted by the encryption logic that can be decrypted only by a person who is authorized to read the event information. Further, the event information may be transmitted by establishing the communication channel so as to inhibit the driver or the like from knowing the timing at which the event information is concealed from the owner or the driver of the vehicle, that is, from knowing when the event information is transmitted.

FIG. 6 is a diagram illustrating an example of contents of the event information recorded in the memory 26 and the memory medium 40. A "date/time" is the occurrence date/time of an event, "positional information" is the occurrence place of the event, an "event type" is the type of the event, and an "angular velocity", an "acceleration", and a "speed" are respectively contents of the angular velocity data, the acceleration data, vehicle speed data, and the like obtained before and after the occurrence of the event. A "recording size" is file size of the following files which is defined by settings. A "travel distance" is information on a travel distance or the like obtained after the occurrence of the event. A "video file" and an "audio file" are respectively files of video data and audio data that are obtained before and after the occurrence of the event.

(7) Reproduction of the event information and operation analysis.

The operation management section 25 performs reproduction of the event information recorded in the memory 26 and the operation analysis. Specifically, the operation analysis is an analysis or the like of a manipulation tendency exhibited by the driver in manipulation of the vehicle. The manipulation tendency is, for example, a repeated habit or tendency specific to the driver such as the driver's performing abrupt acceleration often, being slow to start braking, or being likely to cause a wobble. The analysis of the manipulation tendency is, for example, to express the contents of the event and the manipulation (driving) performed by the driver who has caused the event in the form of graphical display or in the numerical form based on a relative comparison between the number of occurrence times classified according to the event and reference information or the like. The latter may be output as a report named "driving diagnosis chart". An evaluation by scoring or ranking based on a comparison to a predefined good pattern is also a type of analysis of the manipulation tendency.

Note that, the general behavior, the dangerous behavior, and the accident-related behavior are not particularly distinguished in the analysis of the manipulation tendency. The manipulation tendency characteristic of the driving of the vehicle is exhibited at the occurrence of any event. For example, not only those skilled in the art but also a wide range of people recognize the fact that a graph obtained when the event of abrupt starting occurs shows a steep upward curve of the acceleration at the time of starting and exhibits no smoothness in its entire shape. Therefore, the type of behavior is not necessarily a particular problem as long as changes in the operation information within a given time period can be expressed in the numerical form with a high accuracy.

(8) Display of analysis results and the like.

In response to selection made by the manipulator of the portable information terminal 20, the operation management section 25 displays the results of the analysis of the manipulation tendency for the vehicle and the other operation management in the display area 20*a* of the portable information terminal 20. For example, FIGS. 7A and 7B illustrate driving diagnosis charts indicating the manipulation tendency exhibited by the driver, which can be displayed by switching over screens in the display area 20*a* of the portable information terminal 20.

Figure 7A:
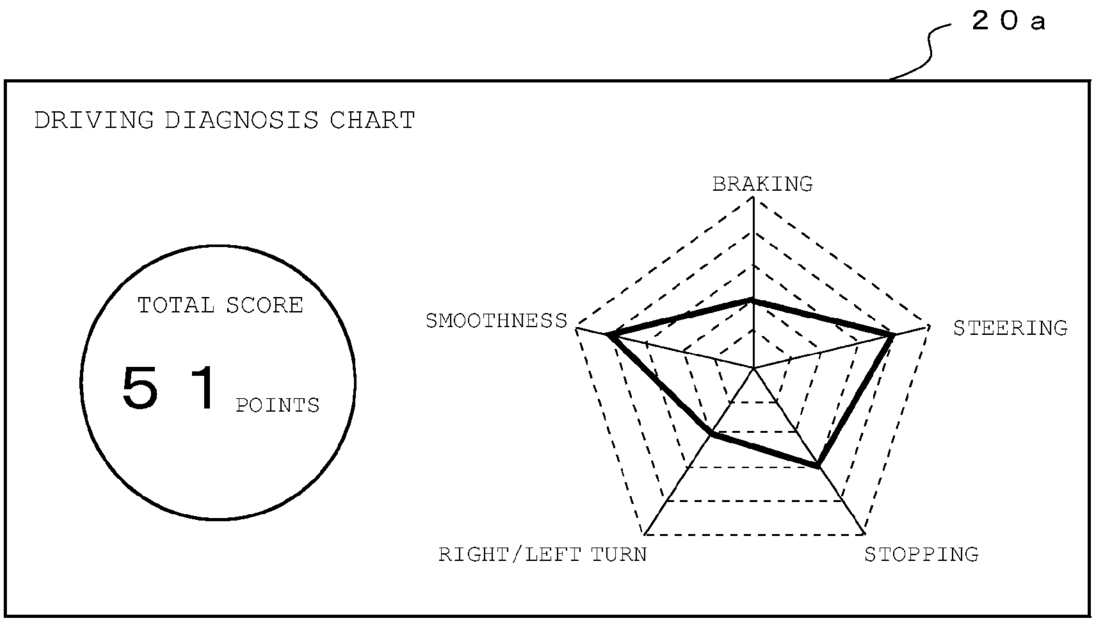
FIGS. 7A and 7B illustrate an example of output contents of operation analysis results in operation management.
Figure 7B:
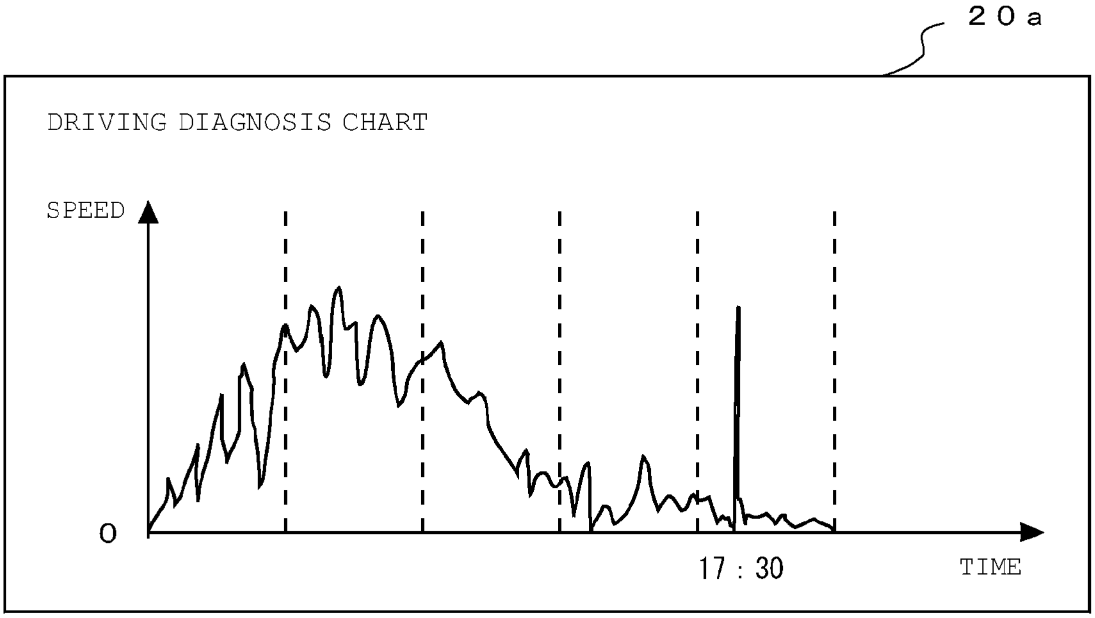

A radar chart exemplified on the right side of the driving diagnosis chart illustrated in FIG. 7A is obtained by summarizing data for each of the following factors of a driving operation to perform a rating evaluation.

In FIG. 7A, the factor "braking" is set by assuming that the behavior caused immediately before the speed becomes zero is braking and by quantifying a time required after the start of deceleration found by the analysis of the acceleration data until the speed becomes zero in comparison with a reference time. As the time becomes shorter, the braking is more abrupt, and thus the timing to apply the brakes tends to be less appropriate.

The factor "steering" is set by quantifying the frequency and strength of the wobbling caused within a fixed time period during the manipulation of a steering wheel found by the analysis of the angular velocity data in comparison with the reference information.

The factor "stopping" is set by quantifying the degree of a change (deceleration) of the acceleration data after the traveling at a constant speed until the speed becomes zero, thereby indicating, for example, how often pumping brakes tend to be used.

The factor "right/left turn" is set by quantifying the degree of speed exhibited at the time of a right turn or a left turn clarified by the angular velocity data in comparison with a reference speed.

The factor "smoothness" is set by quantifying a time after the start of predetermined acceleration until reaching the constant speed or a time after the constant speed until predetermined deceleration, which is clarified by the acceleration data, in comparison with a reference time.

For example, it is a known fact that making a right turn or a left turn at a high speed greatly changes a posture of the vehicle, which can cause a traffic accident, and further imposes a large load on tires and devices that form the vehicle, which is dangerous. Therefore, the above-mentioned driving diagnosis chart can be used to prompt the driver to improve the manipulation tendency in order to prevent such a traffic accident as well. The "total score" indicated on the left side of the driving diagnosis chart is calculated based on the comparison between the results of the analyses in terms of the respective factors and data on a good driver recorded in advance, and is displayed in the display area 20*a*.

The driving diagnosis chart illustrated in FIG. 7B is a graph indicating how the speed of the vehicle changes after the driver starts driving until the end of the driving on the vertical axis and the lapse of time on the horizontal axis. The driving diagnosis chart shows, for example, a low vehicle speed in a time slot before and after 17:30, from which traveling in a traffic jam is assumed, but the time slot includes an area in which the vehicle speed exhibits a steep rise and a steep drop. This is because the driver performed abrupt starting/abrupt acceleration and immediately performed abrupt deceleration, which is assumed to be a dangerous manipulation in general. By being presented with those driving diagnosis charts, the driver is expected to be aware of his/her manipulation tendency for the driving and to bear safe driving in mind.

(9) Output of the alert information.

The operation management section 25 acquires the environmental information that influences the operation of the portable information terminal 20 from the cradle 10 by the short-range radio communications, and determines whether or not the acquired environmental information is within an allowable range set in advance. If the acquired environmental information is out of the allowable range, the operation management section 25 generates the alert information and outputs the alert information to the display 29 on all such occasions. The term "environmental information" used herein represents the detection result from the environment detection sensor 104 included in the sensor section 11 of the cradle 10. The detection result is temperature data in a case where the environment detection sensor 104 is a thermometer, and the environmental information indicates the value of the ambient temperature of the cradle 10, that is, the ambient temperature of the portable information terminal 20 placed in the holder 10*a*. The allowable range is a range recommended as a use environment for the portable information terminal 20. Further, an output of the generated alert information may be in the form of sound or flashing light as long as the output can be recognized by the driver.

In addition, for example, if the range recommended as the use environment for the portable information terminal 20 is exceeded, there is a fear that the event information may be generated by a malfunction of the portable information terminal 20 even if the event might not be generated in a normal environment. In order to avoid the use of the inaccurate event information, if the temperature data transmitted from the cradle 10 is out of the allowable range set in advance, the operation management section 25 can cancel the setting of the automatic transmission to the operation management server 30 or can also restrict the recording to the memory 26 and the memory medium 40.

Note that, when the temperature data is received every predetermined cycle, if the temperature data obtained in the previous cycle and the temperature data obtained in the present cycle are both out of the allowable range, the operation management section 25 may generate the alert information and output the alert information to the display 29 on all such occasions. Further, each time it is detected by a timer or the like that a predetermined time has elapsed, the operation management section 25 may receive the temperature data. With this configuration, in such an environment that an abrupt change in temperature does not occur, it is possible to reduce the load imposed on the processing of the portable information terminal 20.

Operation Example

Next described is an operation example in which the cradle 10 and the portable information terminal 20, which are configured as described above, are operated as the drive recorder. In an operation thereof, the settings are first performed on the portable information terminal 20 in terms of basic information, the behavior condition, the allowable range of the environmental information, the transmission address of the operation management server 30, the communication environment with respect to the cradle 10, and other setting items.

Figure 8:
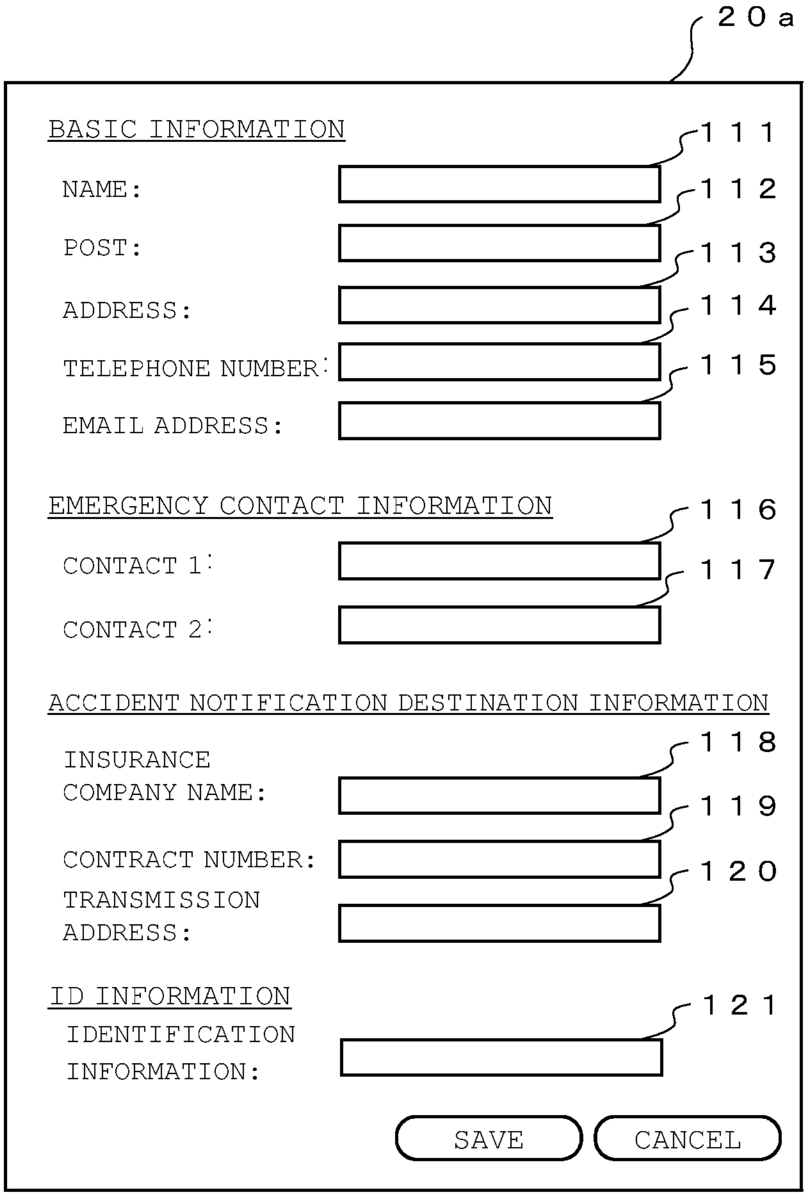
FIG. 8 illustrates an example of an input screen for basic information.

FIG. 8 illustrates an example of a screen for setting the basic information. The operation management section 25 of the portable information terminal 20 displays a screen 20*a* for setting the basic information used for the operation management, that is, the personal information on the driver, on the display 29.

On the screen 20*a*, an input area 111 for inputting a "name" of the driver, an input area 112 for inputting a "post" to which the driver is assigned such as a department, an input area 113 for inputting an "address" of the driver, an input area 114 for inputting a "telephone number" indicating a contact number of the driver, and an input area 115 for inputting a "email address" of the driver are provided to corresponding fields. Further, input areas 116 and 117 labeled "contact 1" and "contact 2", respectively, for inputting an emergency contact of the driver (for example, email addresses of a family and a company) are provided to corresponding fields. In addition, an input area 118 for inputting an "insurance company name" dealing in an automobile liability insurance to which the vehicle on which the cradle 10 is mounted is contracted, an input area 119 for inputting a "contract number" of the automobile liability insurance to which the vehicle is contracted, an input area 120 for inputting a "transmission address" such as a telephone number or an email address to be a contact of the insurance company, and an input area 121 for inputting unique "identification information" for uniquely determining the portable information terminal 20 are provided to corresponding fields.

When data is input into the respective input areas 111 to 121, a recording destination thereof can be specified by choosing "SAVE". In this embodiment, the recording destination is set in the memory 26. Therefore, the personal information is recorded in the memory 26. At this time, if the setting of the communication environment based on the short-range radio communications with respect to the cradle 10 has been finished, the above-mentioned input information can also be recorded in the memory medium 40 by specifying the management data recording area of the memory medium 40 as well.

Figure 9:
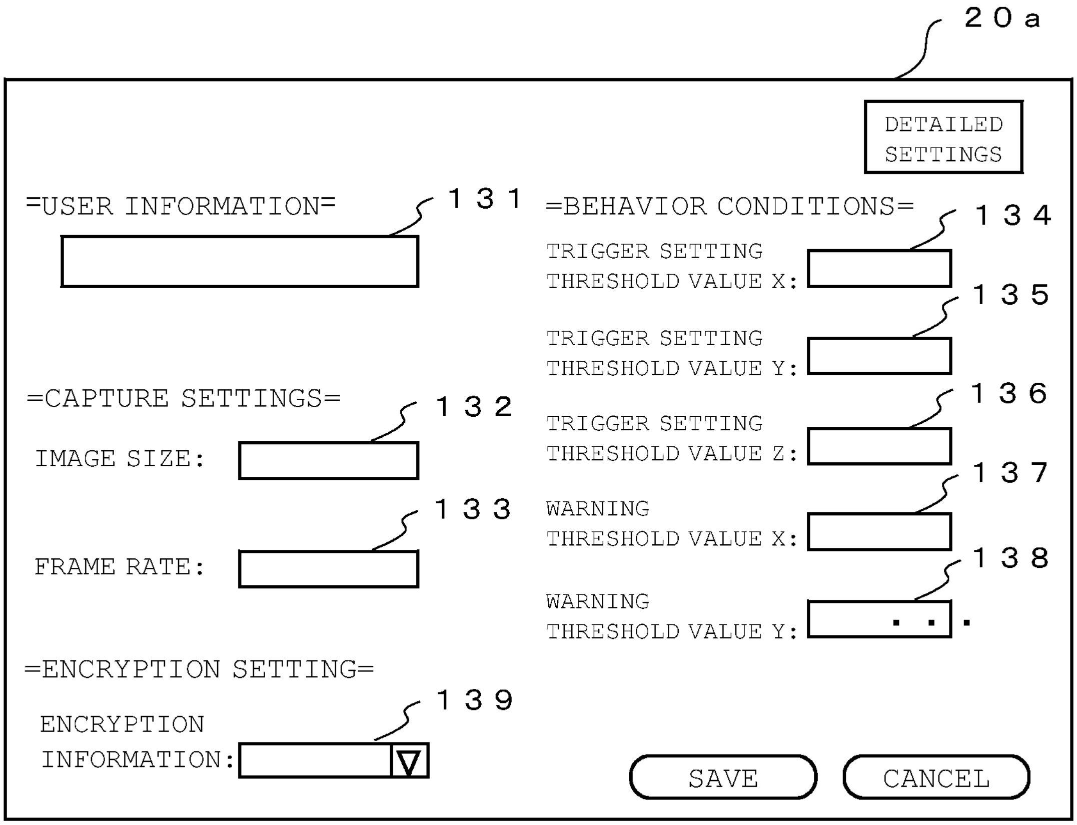
FIG. 9 illustrates an example of a setting screen for different kinds of conditions.

Subsequently, the different kinds of conditions and the like are set. FIG. 9 illustrates an example of a screen for setting the behavior conditions and the like. In the example illustrated in FIG. 9, an input area 131 for user information for personalizing the setting conditions and an input area 132 for an image size and an input area 133 for a frame rate, which are capture settings, that is, conditions for collecting the operation information, are provided on the screen 20*a*.

Further, provided to corresponding fields as the behavior conditions are an input area 134 for a trigger setting threshold value X (threshold value of the acceleration of the vehicle in the lateral direction), an input area 135 for a trigger setting threshold value Y (threshold value of the acceleration of the vehicle in the fore-and-aft direction), and an input area 136 for a trigger setting threshold value Z (threshold value of the acceleration of the vehicle in the vertical direction), which are used for detecting the occurrence of the dangerous behavior, an input area 137 for a warning threshold value X (threshold value of the acceleration of the vehicle in the lateral direction, smaller than the trigger setting threshold value X), an input area 138 for a warning threshold value Y (threshold value of the acceleration of the vehicle in the fore-and-aft direction, smaller than the trigger setting threshold value Y), and so on, which are used for outputting a warning in a step before a dangerous behavior. Input areas are similarly provided for a set of threshold values for detecting the occurrence of the general behavior and a set of threshold values for detecting the occurrence of an accident signal.

Note that, the occurrence of the accident-related behavior may be detected when triggered by an input of the accident signal from the external portion.

In addition, an input area 139 for the encryption information for identifying the encryption logic used when the recording is performed on the memory medium 40 is provided.

The input information in the input area 121 for the identification information on the basic information is transferred to the input area 131. When data is input into the other input areas 132 to 139 and so on, a recording destination thereof can be specified by choosing "SAVE". In this embodiment, the recording destination is set to the memory 26 and the management data recording area of the memory medium 40, and the above-mentioned input information is also recorded onto the memory medium 40. Therefore, for example, a person who has issued the memory medium 40 can collect the memory medium 40 after the end of the operation and perform the operation analysis based on the set different kinds of conditions, while the automobile liability insurance company with which the vehicle on which the cradle 10 is mounted is contracted can collect the memory medium 40 and perform the operation analysis based on the set different kinds of conditions and the like. Note that, in the same manner as the basic information, it is possible to specify only the memory 26.

Prior to the driving of the vehicle, the driver inserts the memory medium 40 into the medium receiving mechanism 15 of the cradle 10 mounted on the vehicle, and sets the portable information terminal 20 including the memory 26 in which the different kinds of conditions are recorded in the holder 10*a* of the cradle 10.

When the driver starts an engine of the vehicle, power is supplied from the vehicle to the cradle 10, and with the trigger of the power supply, the detection of the behavior is started by the sensor section 11 of the cradle 10 and the sensor section 21 of the portable information terminal 20.

Main Operation Procedure for the Cradle

Figure 10:
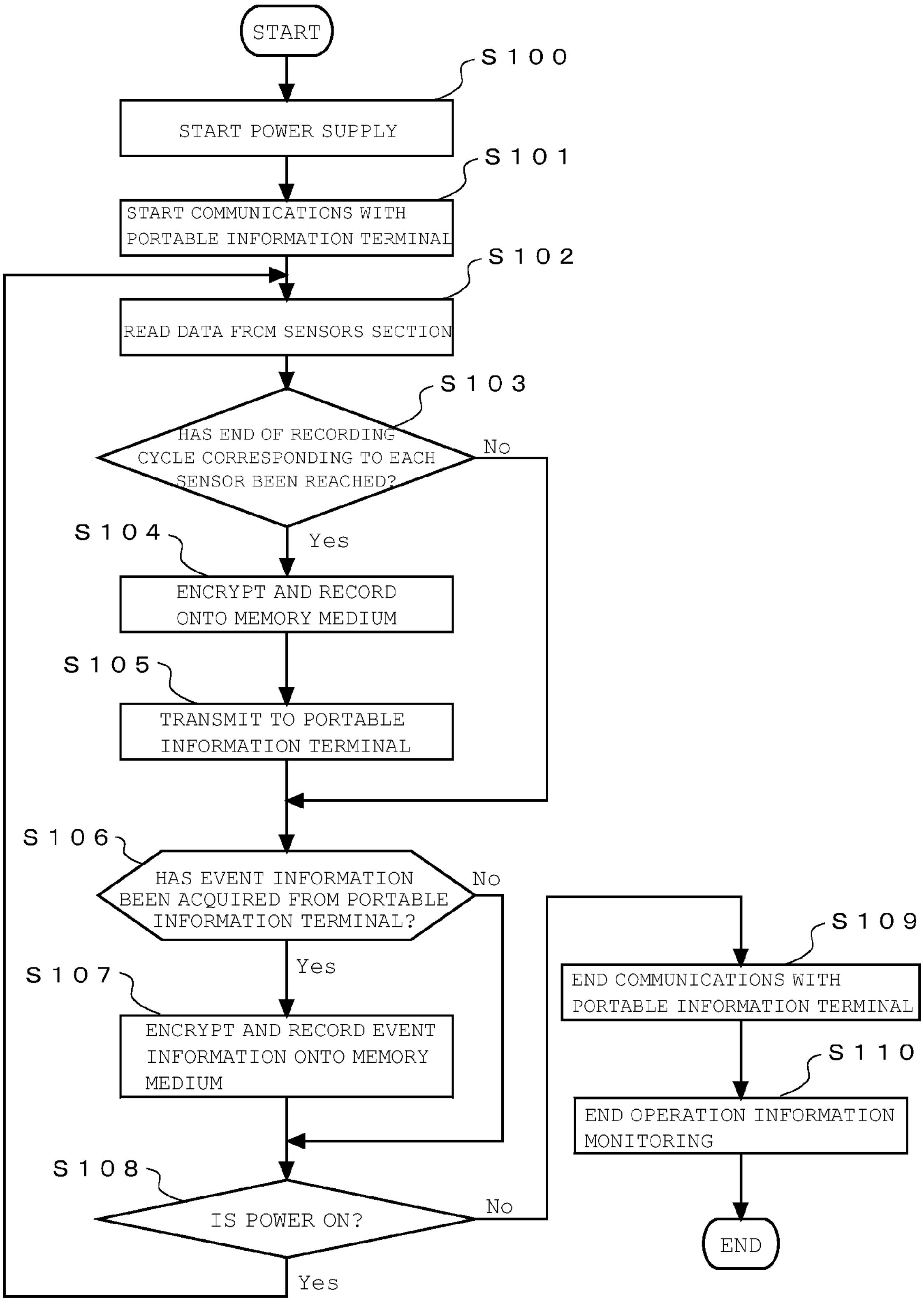
FIG. 10 is an explanatory diagram of a processing procedure followed by the cradle.

The cradle 10 operates according to, for example, a procedure illustrated in FIG. 10. That is, with the trigger of the power supply (Step S100), the cradle 10 starts the short-range radio communications with the portable information terminal 20 through the data communication I/F 12, and further monitors a communication state at all times (Step S101). Further, the cradle 10 starts reading the operation information, which is the detection result from the sensor section 11 (Step S102). The cradle 10 determines whether or not the end of a recording cycle, for example, 1-second cycle, of each sensor such as the angular velocimeter 101 has been reached, and if the end has been reached (Step S103: Yes), the procedure advances to Step S104. If the end has not been reached (Step S103: No), the procedure advances to Step S106.

In Step S104, the cradle 10 encrypts the operation information read at a point in time when the end of the recording cycle is reached and records the encrypted operation information onto the memory medium 40. Further, the cradle 10 transmits the operation information to the portable information terminal 20 (Step S105). If the event information is acquired from the portable information terminal 20 (Step S106: Yes), the cradle 10 encrypts the event information and records the encrypted event information onto the memory medium 40 (Step S107).

While the cradle 10 is powered on (Step S108: Yes), the procedure repeats Step S102 of reading the operation information and the subsequent steps. When the power is turned off (Step S108: No), the cradle 10 ends the short-range radio communications with the portable information terminal 20 (Step S109), and ends the operation information monitoring (Step S110).

Here, if communications with the portable information terminal 20 are impossible, the operation information can also be recorded onto the memory medium 40 with an unsent flag set. This also allows the cradle 10 to transmit only the untransmitted operation information to the portable information terminal 20 at a point in time when the cradle 10 detects that the short-range radio communications with the portable information terminal 20 becomes possible again.

Main Operation Procedure for the Portable Information Terminal

Figure 11:
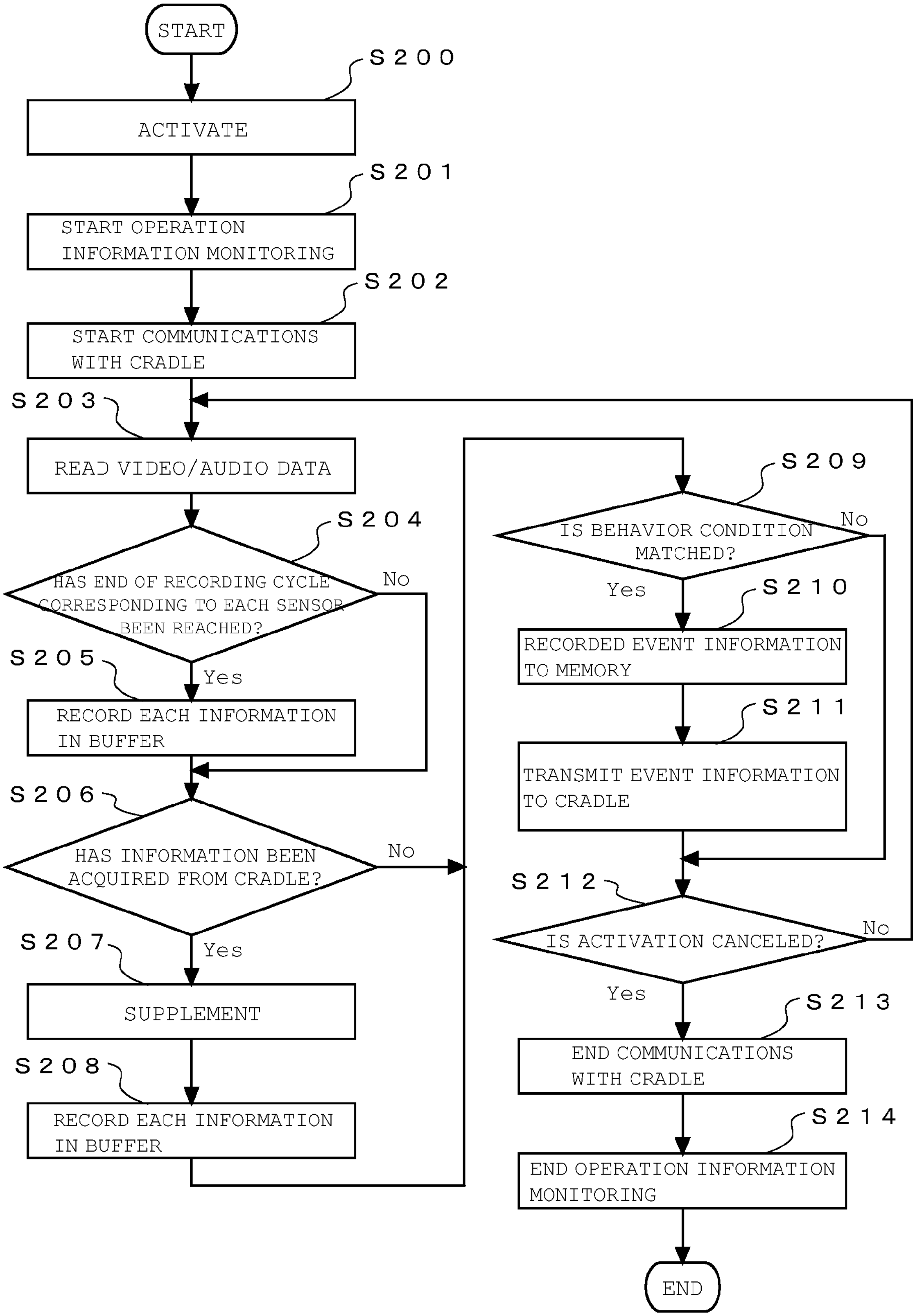
FIG. 11 is an explanatory diagram of a processing procedure followed by the portable information terminal.

Next, FIG. 11 is referenced to describe a main operation procedure for the portable information terminal 20. It is assumed that the driver (manipulator) has activated an operation management function of the portable information terminal 20 (Step S200). In that case, the angular velocimeter 101, the accelerometer 102, and the GPS receiver 103 of the sensor section 11 having a higher accuracy are set in advance to be used as source sensors that output information for supplementation in place of the accelerometer 201 and the GPS receiver 202 of the sensor section 21.

The portable information terminal 20 starts the operation information monitoring based on the detection result of the behavior and the like of the vehicle which is acquired by the sensor section 21 (Step S201), and further starts the short-range radio communications with the cradle 10 through the data communication I/F 22 (Step S202).

The portable information terminal 20 starts reading video data output from the camera 204 of the sensor section 21 and audio data output from the sound collecting microphone 203 (Step S203), and determines whether or not the video data and the audio data have reached the end of the recording cycle of each sensor (Step S204). If the end has been reached, the procedure advances to Step S205 (Step S204: Yes), and if the end has not been reached, the procedure advances to Step S206 (Step S204: No). In Step S205, the portable information terminal 20 records, in the buffer 28, the video data and the audio data read at a point in time when the end of the recording cycle is reached. In Step S206, the portable information terminal 20 determines whether or not the information for supplementation has been acquired from the cradle 10.

If the information for supplementation has been acquired (Step S206: Yes), by combining the information that has already been recorded in the buffer 28 and the newly-acquired information for supplementation while maintaining synchronization between timestamps thereof, the portable information terminal 20 supplements the detection information obtained on the portable information terminal 20 (Step S207), and records the supplemented detection information in the buffer 28 (Step S208). Then, the portable information terminal 20 compares the detection information recorded in the buffer 28 and the behavior condition to thereby determine whether or not there is matching detection information (Step S209). If there is detection information matching the behavior condition, for example, if the acceleration data exceeds any one of the trigger setting threshold value X, the trigger setting threshold value Y, and the trigger setting threshold value Z that are described above (Step S209: Yes), the portable information terminal 20 generates the event information given the type of the event indicating the dangerous behavior and records the event information to the memory 26 (Step S210) while transmitting the event information to the cradle 10 and recording the event information onto the memory medium 40 (Step S211). In a case where the automatic transmission to the transmission address is set, the portable information terminal 20 encrypts the event information and transmits the encrypted event information also to the operation management server 30.

The portable information terminal 20 repeats the above-mentioned operation as long as the operation management function of the portable information terminal 20 is activated (Step S212: No), and if the activation is canceled (Step S212: Yes), the portable information terminal 20 ends the short-range radio communications with the cradle 10 (Step S213), and ends the operation information monitoring (Step S214).

Figure 12:
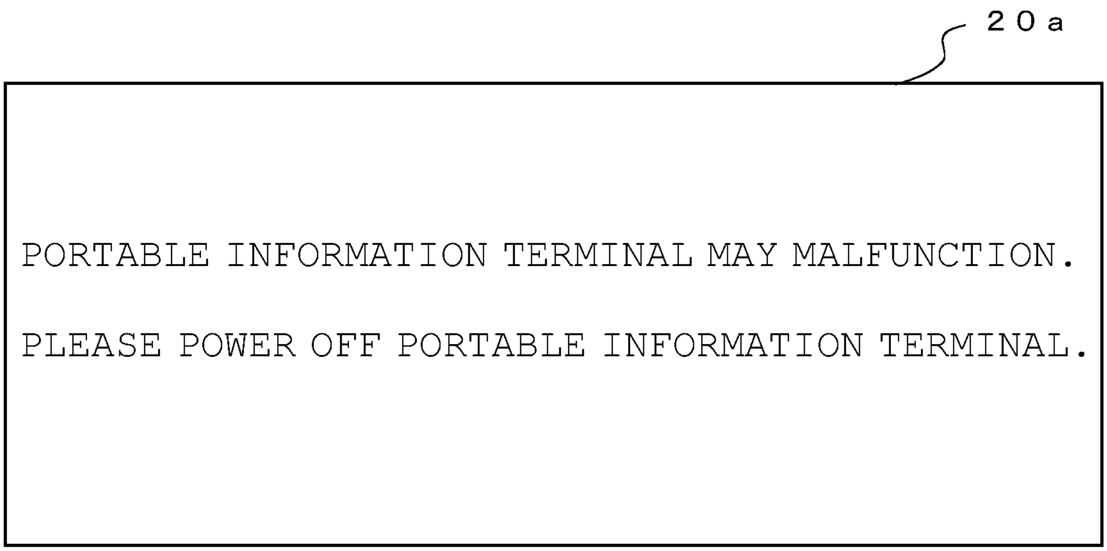
FIG. 12 illustrates an output screen for alert information.

In the course of the above-mentioned operation information monitoring, when the portable information terminal 20 detects that the environmental information transmitted from the cradle 10, for example, the temperature data, has exceeded the allowable range set in advance, the portable information terminal 20 generates the alert information and displays the alert information on the display 29 on all such occasions. FIG. 12 illustrates an example of the alert information displayed on the display 29. By displaying the alert information as described above, the driver (manipulator) can recognize that the portable information terminal 20 is in a dangerous state and take appropriate measures such as a power-off operation.

As described above, according to this embodiment, the short-range radio communications are performed between the sensor section 21 for detecting the operation information including the behavior of the vehicle and the timestamp, position, video image obtained at the time of the occurrence of the behavior and the cradle 10 including the sensor section 11 for detecting the behavior of the vehicle with a higher accuracy than the sensor section 21, thereby enabling the supplementation of the operation information, and the portable information terminal 20 is configured to determine whether or not the supplemented operation information matches the behavior condition, and if the supplemented operation information matches the behavior condition, record the supplemented operation information obtained at the time of the occurrence of the behavior as the event information to the memory 26 and the memory medium 40 of the cradle 10, thereby enabling more accurate determination as to whether or not the behavior condition is matched.

Therefore, even in a case of using the portable information terminal 20 including the sensor section 21 selected to have relatively lower accuracy and sensitivity because the portable information terminal 20 is basically manipulated by a human, the operation management function having a high accuracy, for example, a drive recorder function can be realized by causing the portable information terminal 20 to work in conjunction with the cradle 10.

With regard to the cradle 10, it is possible to lower a production cost of the cradle 10 by providing the portable information terminal 20 with a large number of constituent parts and functional portions that are necessary to realize the drive recorder function.

Further, the detection result from the second sensor section is recorded on the memory medium 40, and hence the operation analysis can be performed after the end of the operation even if the portable information terminal 20 is forgotten to be set in the holder 10*a* or if the portable information terminal 20 causes a failure or is lost. In addition, the setting contents such as the behavior condition are recorded onto the memory medium 40 in the management data recording area, and hence the operation analysis can also be performed based on the set different kinds of conditions.

Further, the cradle 10 and the portable information terminal 20 transmit information to each other by the short-range radio communications within the coverage from tens of centimeters to several meters, with the result that the routing of wire cables inside an automobile becomes unnecessary and that a leak of information to outside the automobile or skimming by a person with malicious intention can be suppressed, thereby enabling highly convenient operation. Further, the portable information terminal 20 transmits the event information to the operation management server 30 by public communications, which facilitates speedy transmission of the event information to the external portion (administrator of the operation management server 30 or the like).

Further, the encryption logic to be used can be identified by the encryption information, and hence the encryption logic to be used can be switched over flexibly and quickly even in, for example, a case where the specified encryption logic differs depending on the automobile liability insurance company with which the vehicle is contracted, a case where different drivers drive the vehicle, or a case where the vehicle driven by one driver changes many times a day.

Further, in this embodiment, the environmental information that affects the accuracy of results of an information processing performed by the portable information terminal 20 is acquired from the cradle 10 through short-range radio communication means, it is determined whether or not the acquired environmental information is within the allowable range set in advance, and the alert information is generated and output to the display 29 on all such occasions. Accordingly, it is possible to prompt the driver (manipulator) to take a quick action.

Further, in this embodiment, during a period in which the portable information terminal 20 cannot perform communications, an unsent flag is set and the operation information is recorded onto the memory medium 40, while the operation information is transmitted as the information for supplementation with the trigger of the fact that the portable information terminal 20 becomes able to perform communications possible again. This allows the driver to concentrate on the driving and contributes to prevention of the occurrence of a traffic accident.

Modified Example

This embodiment has been described above, but the present invention is not limited to the above-mentioned embodiment, and may be carried out in various embodiments. For example, this embodiment is described by taking the cradle 10 having the external appearance and shape illustrated in FIGS. 4A and 4B as an example, but the holder 10*a* of the cradle 10 may be unitarily provided to the receiving casing 10*c*. In this case, the arm 10*b* becomes unnecessary.

Further, this embodiment is described by mainly taking as an example the case of transmitting the information for supplementation from the cradle 10 to the portable information terminal 20, but reversely, the information detected by the portable information terminal 20 may be transmitted to the cradle 10 as the information for supplementation. This is effective in a case where the sensor section 21 of the portable information terminal 20 possesses a measuring instrument that is not possessed by the sensor section 11 of the cradle 10.

Further, in this embodiment, the cradle 10 exemplifies the operation management device, but the cradle 10 is not necessarily be provided as the operation management device as long as a device that can supplement the operation management function realized by the portable information terminal 20 is provided, and a module that can perform the short-range radio communications with the portable information terminal 20 and has a function realized by the cradle 10 may be provided as standard equipment on the vehicle.

Applied Example

The cradle 10 and the portable information terminal 20 can be used as the drive recorder as described above, but the operation management server 30 may host a community site as a communication system among drivers by making use of the public communication function of the portable information terminal 20.

Figure 13:
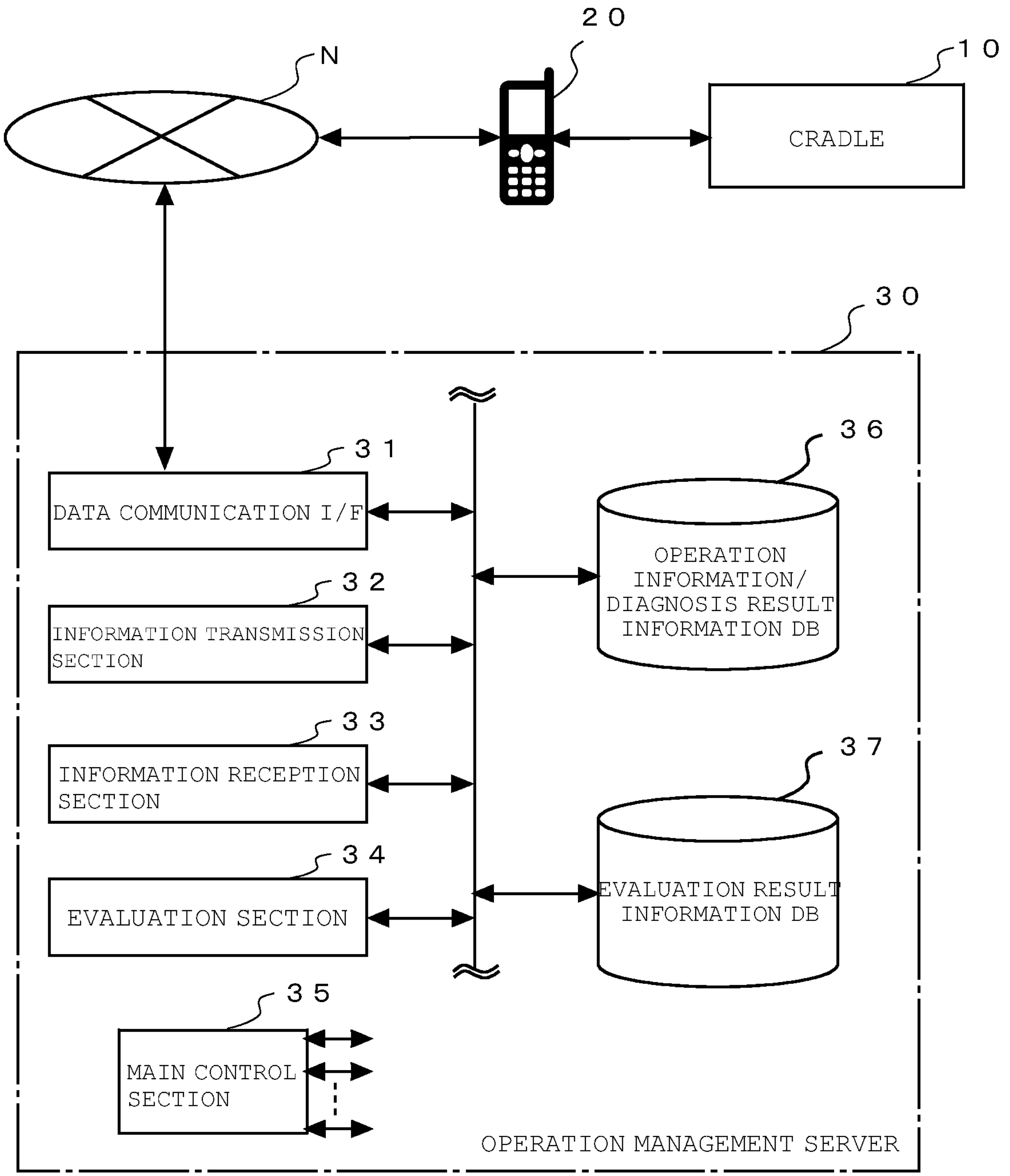
FIG. 13 is a functional configuration diagram of an operation management server.

That is, as illustrated in FIG. 13, the operation management server 30 is caused to have functions of a data communication I/F 31, an information transmission section 32, and an information reception section 33 that are the same as those of the portable information terminal 20 and a function of an evaluation section 34. A mass storage device is provided to the operation management server 30, and an operation information/diagnosis result information database (hereinafter, abbreviated as "DB") 36 and an evaluation result information DB 37 are constructed in the mass storage device. The data communication I/F 31, the information reception section 33, and a main control section 35 constitute information acquiring means.

The main control section 35 comprehensively controls operations of the respective components, and sets part of the mass storage device as a common access area in which a plurality of manipulators of the portable information terminals 20 can upload information and the uploaded information can be viewed by the respective portable information terminals 20. The main control section 35 also functions as management means for managing posting, deletion, and the like of information with respect to the common access area. Further, the main control section 35 performs control for accumulating the operation information (such as video images and sound) that indicates operation contents of the vehicle and is acquired through the data communication I/F 31 along with the identification information on an information providing source and diagnosis result information (such as the driving diagnosis charts illustrated in FIGS. 7A and 7B) generated based on the operation information, in the operation information/diagnosis result information DB 36 in association with the identification information on the information providing source.

The evaluation section 34 classifies the operation information accumulated in the operation information/diagnosis result information DB 36 according to an operation environment, performs the ranking evaluation of the classified operation information, and accumulates the ranking evaluation in the evaluation result information DB 37.

Each of the respective portable information terminals 20 supplements a detection result from the sensor section 21 based on the information for supplementation acquired from the cradle 10, and based on supplemented information, generates the operation information and the diagnosis result information to be uploaded into the above-mentioned community site.

In the case of the diagnosis result information, in order to standardize an evaluation reference therefore, the manipulator of the portable information terminal 20 uploads the diagnosis result information along with classification codes indicating the operation environment, that is, an identification code for identifying whether or not the cradle 10 is used to supplement the information, a time slot code indicating a time slot in which the vehicle is in operation, a region code indicating a region in which the vehicle is in operation, and other such classification codes.

The operation management server 30 summarizes those pieces of uploaded information every fixed time period, and successively posts the operation information in a specific area. On the other hand, the diagnosis result information is classified according to the common classification code to perform the ranking evaluation of the "total score".

The manipulator of the portable information terminal 20 who has uploaded the information can access the common access area to view those pieces of information at any time.

Accordingly, a plurality of drivers are allowed to compare themselves with the other as to, for example, who drove with better fuel efficiency or who drove with smoothness exhibiting a smaller change in the behavior of the vehicle under the same operation conditions, to thereby encourage the safe driving and suppress the occurrence of a traffic accident.

Figure 14:
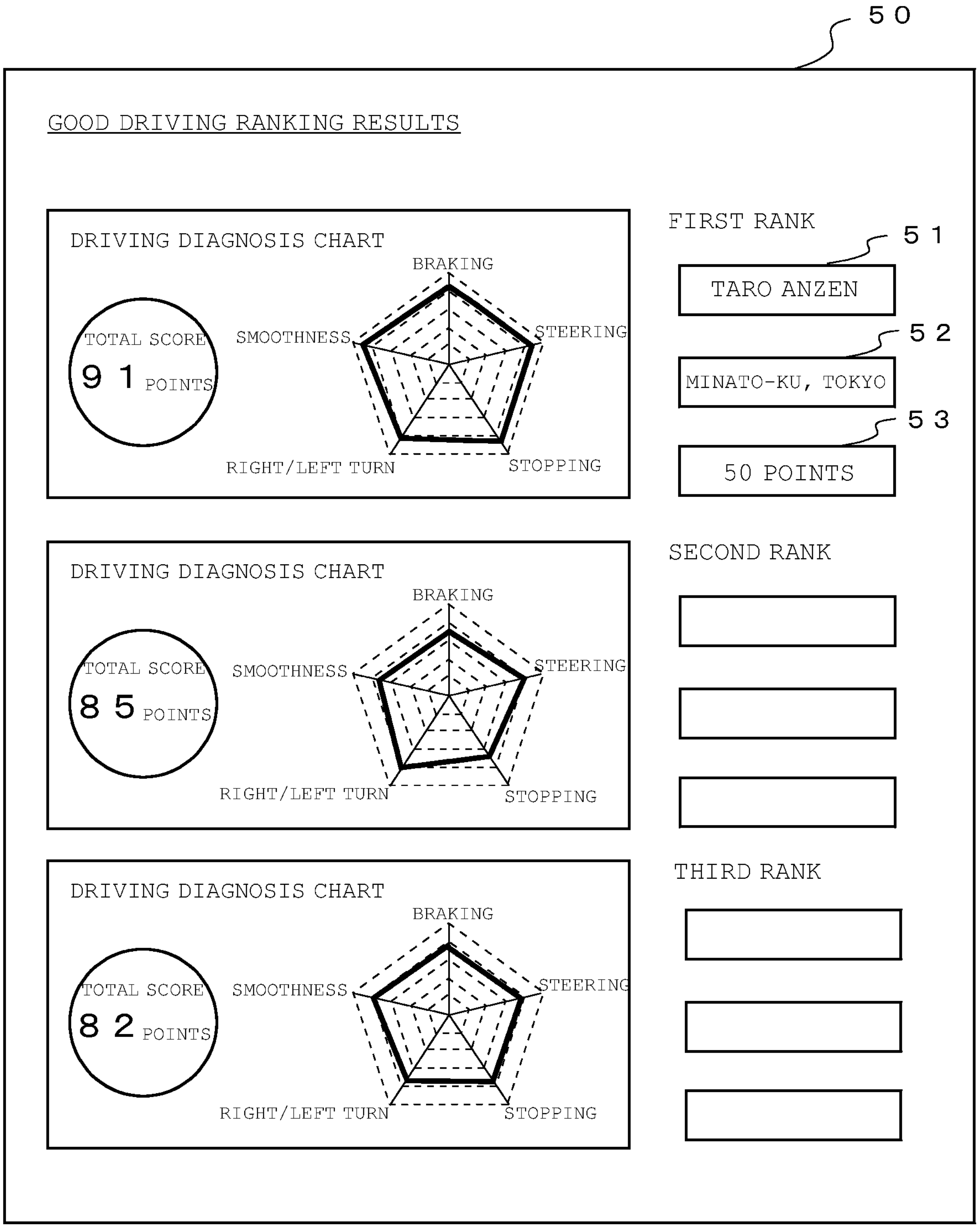
FIG. 14 is an explanatory diagram illustrating contents of a ranking evaluation as an example to which the present invention is applied.

FIG. 14 is an example of contents of a screen 50 showing good driving ranking results posted in the common access area. On the screen 50, a nickname or the like of the driver is displayed in a display field 51 filled in with "Taro Anzen". A region indicating a range in which the driver was driving when the "total score" was obtained is displayed in a display field 52 filled in with "Minato-ku, Tokyo" after being translated from the classification code, the GPS data, or the like. Points given to the driver from the administrator of the community site in conjunction with the current ranking of "good driving ranking results" is displayed in a display field 53 filled in with "50 points". More points are given for a higher rank, and the points are accumulated for each driver. Accordingly, it is possible to further encourage the safe driving and further suppress the occurrence of a traffic accident.

FIG. 1
10 CRADLE
20 PORTABLE INFORMATION TERMINAL
30 OPERATION MANAGEMENT SERVER
40 MEMORY MEDIUM
(1) DISPLAY
(2) FIRST SENSOR SECTION
(3) OPERATION MANAGEMENT SECTION
(4) PUBLIC COMMUNICATION NETWORK
(5) SHORT-RANGE RADIO COMMUNICATIONS
(6) PORTABLE INFORMATION TERMINAL SECURING HOLDER
(7) SECOND SENSOR SECTION
(8) MEDIUM RECEIVING MECHANISM
(9) VEHICLE
FIG. 2
10 CRADLE
12 DATA COMMUNICATION I/F
13 INFORMATION TRANSMISSION SECTION
14 INFORMATION RECEPTION SECTION
15 MEDIUM RECEIVING MECHANISM
16 MAIN CONTROL SECTION
30 OPERATION MANAGEMENT SERVER
40 MEMORY MEDIUM
101 ANGULAR VELOCIMETER
102 ACCELEROMETER
103 GPS RECEIVER
104 ENVIRONMENT DETECTION SENSOR
105 EXTERNAL SWITCH
FIG. 3
(1) DATE/TIME
(2) FORE-AND-AFT ACCELERATION
(3) LATERAL ACCELERATION
(4) VERTICAL ACCELERATION
(5) ROLL ANGULAR VELOCITY
(6) PITCH ANGULAR VELOCITY
(7) AZIMUTH ANGULAR VELOCITY
(8) POSITIONAL INFORMATION (LATITUDE)
(9) POSITIONAL INFORMATION (LONGITUDE)
FIG. 4A
DASHBOARD
FIG. 4B
DASHBOARD
FIG. 5
10 CRADLE
20 PORTABLE INFORMATION TERMINAL
22 DATA COMMUNICATION I/F
23 INFORMATION TRANSMISSION SECTION
24 INFORMATION RECEPTION SECTION
25 OPERATION MANAGEMENT SECTION
26 MEMORY
27 MAIN CONTROL SECTION
28 BUFFER
29 DISPLAY
30 OPERATION MANAGEMENT SERVER
201 ACCELEROMETER
202 GPS RECEIVER
203 SOUND COLLECTING MICROPHONE
204 CAMERA
FIG. 6
(1) DATE/TIME
(2) POSITIONAL INFORMATION
(3) EVENT TYPE
(4) ANGULAR VELOCITY
(5) ACCELERATION
(6) SPEED
(7) RECORDING SIZE
(8) TRAVEL DISTANCE
(9) VIDEO FILE
(10) AUDIO FILE
FIG. 7A
(1) DRIVING DIAGNOSIS CHART
(2) TOTAL SCORE
(3) POINTS
(4) BRAKING
(5) SMOOTHNESS
(6) RIGHT/LEFT TURN
(7) STOPPING
(8) STEERING
FIG. 7B
(1) DRIVING DIAGNOSIS CHART
(2) SPEED
(3) TIME
FIG. 8
(1) BASIC INFORMATION
(2) NAME
(3) POST
(4) ADDRESS
(5) TELEPHONE NUMBER
(6) EMAIL ADDRESS
(7) EMERGENCY CONTACT INFORMATION
(8) CONTACT 1
(9) CONTACT 2
(10) ACCIDENT NOTIFICATION DESTINATION INFORMATION
(11) INSURANCE COMPANY NAME
(12) CONTRACT NUMBER
(13) TRANSMISSION ADDRESS
(14) ID INFORMATION
(15) IDENTIFICATION INFORMATION
(16) SAVE
(17) CANCEL
FIG. 9
(1) USER INFORMATION
(2) CAPTURE SETTINGS
(3) IMAGE SIZE
(4) FRAME RATE
(5) ENCRYPTION SETTING
(6) ENCRYPTION INFORMATION
(7) DETAILED SETTINGS (8) BEHAVIOR CONDITIONS
(9) TRIGGER SETTING THRESHOLD VALUE
(10) WARNING THRESHOLD VALUE
(11) SAVE
(12) CANCEL
FIG. 10
S100 START POWER SUPPLY
S101 START COMMUNICATIONS WITH PORTABLE INFORMATION TERMINAL
S102 READ DATA FROM SENSORS SECTION
S103 HAS END OF RECORDING CYCLE CORRESPONDING TO EACH SENSOR BEEN REACHED?
S104 ENCRYPT AND RECORD ONTO MEMORY MEDIUM
S105 TRANSMIT TO PORTABLE INFORMATION TERMINAL
S106 HAS EVENT INFORMATION BEEN ACQUIRED FROM PORTABLE INFORMATION TERMINAL?
S107 ENCRYPT AND RECORD EVENT INFORMATION ONTO MEMORY MEDIUM
S108 IS POWER ON?
S109 END COMMUNICATIONS WITH PORTABLE INFORMATION TERMINAL
S110 END OPERATION INFORMATION MONITORING
FIG. 11
S200 ACTIVATE
S201 START OPERATION INFORMATION MONITORING
S202 START COMMUNICATIONS WITH CRADLE
S203 READ VIDEO/AUDIO DATA
S204 HAS END OF RECORDING CYCLE CORRESPONDING TO EACH SENSOR BEEN REACHED?
S205, S208 RECORD EACH INFORMATION IN BUFFER
S206 HAS INFORMATION BEEN ACQUIRED FROM CRADLE?
S207 SUPPLEMENT
S209 IS BEHAVIOR CONDITION MATCHED?
S210 RECORDED EVENT INFORMATION TO MEMORY
S211 TRANSMIT EVENT INFORMATION TO CRADLE
S212 IS ACTIVATION CANCELED?
S213 END COMMUNICATIONS WITH CRADLE
S214 END OPERATION INFORMATION MONITORING
FIG. 12
PORTABLE INFORMATION TERMINAL MAY MALFUNCTION. PLEASE POWER OFF PORTABLE INFORMATION TERMINAL.
FIG. 13
10 CRADLE
30 OPERATION MANAGEMENT SERVER
31 DATA COMMUNICATION I/F
32 INFORMATION TRANSMISSION SECTION
33 INFORMATION RECEPTION SECTION
34 EVALUATION SECTION
35 MAIN CONTROL SECTION
36 OPERATION INFORMATION/DIAGNOSIS RESULT INFORMATION DB
37 EVALUATION RESULT INFORMATION DB
FIG. 14
(1) GOOD DRIVING RANKING RESULTS
(2) DRIVING DIAGNOSIS CHART
(3) TOTAL SCORE
(4) POINTS
(5) BRAKING
(6) SMOOTHNESS
(7) RIGHT/LEFT TURN
(8) STOPPING
(9) STEERING
(10) FIRST RANK
(11) TARO ANZEN
(12) MINATO-KU, TOKYO
(13) 50 POINTS
(14) SECOND RANK
(15) THIRD RANK

What is claimed is:

1. A portable information terminal, comprising:

a first sensor section for detecting a behavior of a moving object and operation information on the moving object comprising a timestamp, a position, and a video image that are obtained at an occurrence of the behavior an operation management device comprising a second sensor section for detecting the behavior of the moving object with a higher accuracy than the first sensor section;

short-range radio communication means for performing short-range radio communications with the operation management device;

information acquiring means for acquiring a detection result from the second sensor section from the operation management device through the short-range radio communication means; and operation management means for supplementing a detection result from the first sensor section with the acquired detection result from the second sensor section, determining whether or not the supplemented operation information matches a predetermined condition, and if the predetermined condition is matched, recording the supplemented operation information in a predetermined recording area as event information.

2. A portable information terminal according to claim 1, further comprising:

public communication means for performing public communications; and communication control means for transmitting the event information recorded in the predetermined recording area to a specified communication counterpart through the public communication means.

3. A portable information terminal according to claim 1 or 2, further comprising a display, wherein the operation management means acquires environmental information that affects an operation of the portable information terminal from the operation management device through the short-range radio communication means, determines whether or not the acquired environmental information is within an allowable range set in advance, generates alert information if the acquired environmental information is out of the allowable range, and outputs the alert information to the display.

4. An operation management device to be mounted to a moving object, comprising:

a portable information terminal for performing operation management of the moving object to a predetermined site of the moving object;

a holder for securing the portable information terminal, the portable information terminal comprising a first sensor section for detecting a behavior of the moving object and operation information on the moving object comprising a timestamp, a position, and a video image that are obtained at an occurrence of the behavior;

short-range radio communication means that allows short-range radio communications to be performed with the portable information terminal;

a second sensor section for detecting the behavior of the moving object with a higher accuracy than the first sensor section;

information transmission means for transmitting a detection result from the second sensor section to the portable information terminal through the short-range radio communication means to thereby allow the portable information terminal to supplement the operation management;

information recording means for recording the detection result from the second sensor section onto a memory medium classified according to one of the moving object and a driver who drives the moving object; and a medium receiving mechanism for receiving the memory medium.

5. An operation management device according to claim 4, wherein the information recording means converts the detection result from the second sensor section into a data structure that cannot be decrypted by one of an owner and the driver of the moving object according to an encryption logic identified by encryption information, and records the converted information onto the memory medium.

6. An operation management device according to claim 4 or 5, wherein:

the second sensor section comprises an environment detection sensor for measuring an environment in which the portable information terminal secured to the holder is placed; and the information transmission means transmits a measured value obtained by the environment detection sensor to the portable information terminal through the short-range radio communication means as environmental information.

7. An operation management server, comprising:

a common access area that can be viewed through public communications by the portable information terminal according to claim 3 that performs short-range radio communications with the operation management device according to claim 4;

information acquiring means for acquiring operation information from each portable information terminal;

evaluation means for classifying the acquired operation information according to an operation environment, and performing a ranking evaluation of the classified operation information; and management means for posting result information on the ranking evaluation in the common access area.

8. An operation management server, comprising:

a common access area that can be viewed through public communications by the portable information terminal according to claim 3 that performs short-range radio communications with the operation management device according to claim 5;

information acquiring means for acquiring operation information from each portable information terminal;

evaluation means for classifying the acquired operation information according to an operation environment, and performing a ranking evaluation of the classified operation information; and management means for posting result information on the ranking evaluation in the common access area.

9. An operation management server, comprising:

a common access area that can be viewed through public communications by the portable information terminal according to claim 3 that performs short-range radio communications with the operation management device according to claim 6;

information acquiring means for acquiring operation information from each portable information terminal;

evaluation means for classifying the acquired operation information according to an operation environment, and performing a ranking evaluation of the classified operation information; and management means for posting result information on the ranking evaluation in the common access area.

10. A computer program, which is stored on and can be read by a portable information terminal, the portable information terminal comprising: a first sensor section for detecting a behavior of a moving object and operation information on the moving object comprising a timestamp, a position, and a video image that are obtained at an occurrence of the behavior; a communication function for performing short-range radio communications with a communication counterpart; and a computer, the computer program causing the computer to function as:

information acquiring means for acquiring, from an operation management device comprising a second sensor section, a detection result from the second sensor section through the short-range radio communications, the second sensor section detecting the behavior of the moving object with a higher accuracy than the first sensor section; and operation management means for supplementing a detection result from the first sensor section with the acquired detection result from the second sensor section, determining whether or not the supplemented operation information matches a predetermined condition, and if the predetermined condition is matched, recording the supplemented operation information in a predetermined recording area as event information.

* * * * *